(12) United States Patent
Thompson

(10) Patent No.: US 11,120,247 B2
(45) Date of Patent: Sep. 14, 2021

(54) DEFENSIVE MEASURES FOR RESIDUE RE-IMAGING

(71) Applicant: Synaptics Incorporated, San Jose, CA (US)

(72) Inventor: Erik Jonathon Thompson, Phoenix, AZ (US)

(73) Assignee: Synaptics Incorporated, San Jose, CA (US)

(*) Notice: Subject to any disclaimer, the term of this patent is extended or adjusted under 35 U.S.C. 154(b) by 0 days.

(21) Appl. No.: 16/786,450

(22) Filed: Feb. 10, 2020

(65) Prior Publication Data

US 2020/0184191 A1 Jun. 11, 2020

Related U.S. Application Data

(63) Continuation-in-part of application No. 16/357,306, filed on Mar. 18, 2019.

(60) Provisional application No. 62/644,363, filed on Mar. 16, 2018.

(51) Int. Cl.
*G06K 9/00* (2006.01)
*G06F 21/32* (2013.01)

(52) U.S. Cl.
CPC ......... *G06K 9/00087* (2013.01); *G06F 21/32* (2013.01); *G06K 9/0004* (2013.01)

(58) Field of Classification Search
CPC ... G06K 9/00087; G06K 9/0004; G06F 21/32
USPC ....................................................... 382/115
See application file for complete search history.

(56) References Cited

U.S. PATENT DOCUMENTS

| 6,535,622 | B1 | 3/2003 | Russo et al. | |
|---|---|---|---|---|
| 2002/0050713 | A1 | 5/2002 | Bergenek et al. | |
| 2003/0202687 | A1 | 10/2003 | Hamid et al. | |
| 2004/0026635 | A1 | 2/2004 | Lee et al. | |
| 2004/0096086 | A1 | 5/2004 | Miyasaka et al. | |
| 2004/0252869 | A1 | 12/2004 | Kondo et al. | |
| 2007/0047771 | A1 | 3/2007 | Watanabe et al. | |
| 2008/0212846 | A1* | 9/2008 | Yamamoto | G06F 21/32 382/115 |
| 2012/0195475 | A1 | 8/2012 | Abiko | |
| 2016/0070967 | A1 | 3/2016 | Du et al. | |
| 2017/0032114 | A1 | 2/2017 | Turgeman | |
| 2017/0220842 | A1 | 8/2017 | Thompson et al. | |
| 2018/0005394 | A1 | 1/2018 | Russo et al. | |
| 2019/0251329 | A1 | 8/2019 | Jiang | |

FOREIGN PATENT DOCUMENTS

WO WO 00/51084 8/2000

* cited by examiner

*Primary Examiner* — Abdul-Samad A Adediran
(74) *Attorney, Agent, or Firm* — Paradice and Li LLP

(57) ABSTRACT

An input device includes a fingerprint sensor and a processing system. The fingerprint sensor is configured to capture images of a sensing region of the input device. The processing system is configured to acquire a first image of the sensing region, where the first image includes one or more fingerprints. The processing system compares the first image with one or more adjunct templates to determine a similarity score for each of the one or more fingerprints. The processing system further compares at least one of the fingerprints with one or more fingerprints templates to determine a match score, and selectively authenticates the first image based at least in part on the similarity score and the match score.

18 Claims, 17 Drawing Sheets

DEFENSIVE MEASURES FOR RESIDUE RE-IMAGING

CROSS-REFERENCE TO RELATED APPLICATION

This patent application is a continuation-in-part and claims priority under 35 U.S.C. 120 to commonly owned U.S. patent application Ser. No. 16/357,306 entitled "DEFENSIVE MEASURES FOR RESIDUE RE-IMAGING" filed on Mar. 18, 2019, which claims priority to U.S. Provisional Patent Application No. 62/644,363 entitled "DEFENSIVE MEASURES FOR RESIDUE RE-IMAGING" filed on Mar. 16, 2018 and assigned to the assignee hereof. The disclosure of the prior application is considered part of, and is incorporated by reference in, this patent application.

TECHNICAL FIELD

The present embodiments relate generally to fingerprint detection, and specifically to preventing residue re-imaging during fingerprint detection.

BACKGROUND OF RELATED ART

Authentication is a mechanism for verifying the identity of a user (e.g., an individual or entity) attempting to access a device and/or application. A basic form of authentication may require a user to input a username and password via an input device. However, usernames and passwords are easily stolen and can be used by anyone (e.g., not just the authorized user) to gain access to a corresponding device or application. Thus, modern authentication schemes increasingly rely on biometric sensors (e.g., sensors capable of identifying unique biological characteristics of the user) to provide greater levels of security. Example biometric sensors include fingerprint scanners, facial recognition systems, eye scanners, voice recognition systems, and the like. Biometric inputs typically require the user to physically interact with one or more sensors to perform authentication.

Although more secure, biometric authentication schemes are not without their limitations. For example, fingerprint scanners typically require a user to press his or her finger onto an input surface (such as a display screen) for proper detection. However, the user may often leave a "residual" fingerprint on the input surface (e.g., from oil, sweat, or other residue) at the point of contact with the user's finger. Some fingerprint scanners may be spoofed by the residual fingerprint left on the input surface (e.g., in lieu of the actual user's finger). Thus, when performing fingerprint scanning, it may be desirable to distinguish residual fingerprints from the actual finger being scanned (e.g., to prevent fingerprint scanners or similar biometric authentication devices from granting access to unauthorized users).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A system and method for detecting residual fingerprints during fingerprint authentication is disclosed. One innovative aspect of the subject matter of this disclosure can be implemented in an input device including a fingerprint sensor and a processing system. The fingerprint sensor is configured to capture images of a sensing region of the input device. The processing system may acquire a first image of the sensing region from the fingerprint sensor, where the first image includes one or more fingerprints. The processing system is configured to compare the first image with one or more adjunct templates to determine a similarity score for each of the one or more fingerprints, and to compare at least one of the fingerprints with one or more fingerprint templates to determine a match score. The processing system may selectively authenticate the first image based at least in part on the similarity score and the match score.

Another innovative aspect of the subject matter of this disclosure can be implemented in a method performed by an input device. The method includes steps of acquiring a first image of a sensing region via a fingerprint sensor, where the first image includes one or more fingerprints; comparing the first image with one or more adjunct templates to determine a similarity score for each of the one or more fingerprints; comparing at least one of the fingerprints with one or more fingerprint templates to determine a match score; and selectively authenticating a user of the input device based at least in part on the similarity score and the match score.

Another innovative aspect of the subject matter of this disclosure can be implemented in an input device including a fingerprint sensor, one or more auxiliary sensors, and a processing system. The fingerprint sensor is configured to capture images of a sensing region. The one or more auxiliary sensors are configured to detect forces or proximities of objects in the sensing region. The processing system acquires a first image of the sensing region from the fingerprint sensor and acquires auxiliary sensor data from the one or more auxiliary sensors. The first image includes one or more fingerprints. The auxiliary sensor data indicates the forces or the proximities of one or more objects in the sensing region when the first image is acquired. The processing system is configured to determine a location of each of the one or more fingerprints in the first image, determine a likelihood of a finger at each of the locations based on the auxiliary sensor data, and compare at least one of the fingerprints with one or more fingerprint templates to determine a match score. The processing system may selectively authenticate the first image based at least in part on the match score and the likelihood of a finger at each of the locations in the first image.

BRIEF DESCRIPTION OF THE DRAWINGS

The present embodiments are illustrated by way of example and are not intended to be limited by the figures of the accompanying drawings.

DETAILED DESCRIPTION

Figure 1:
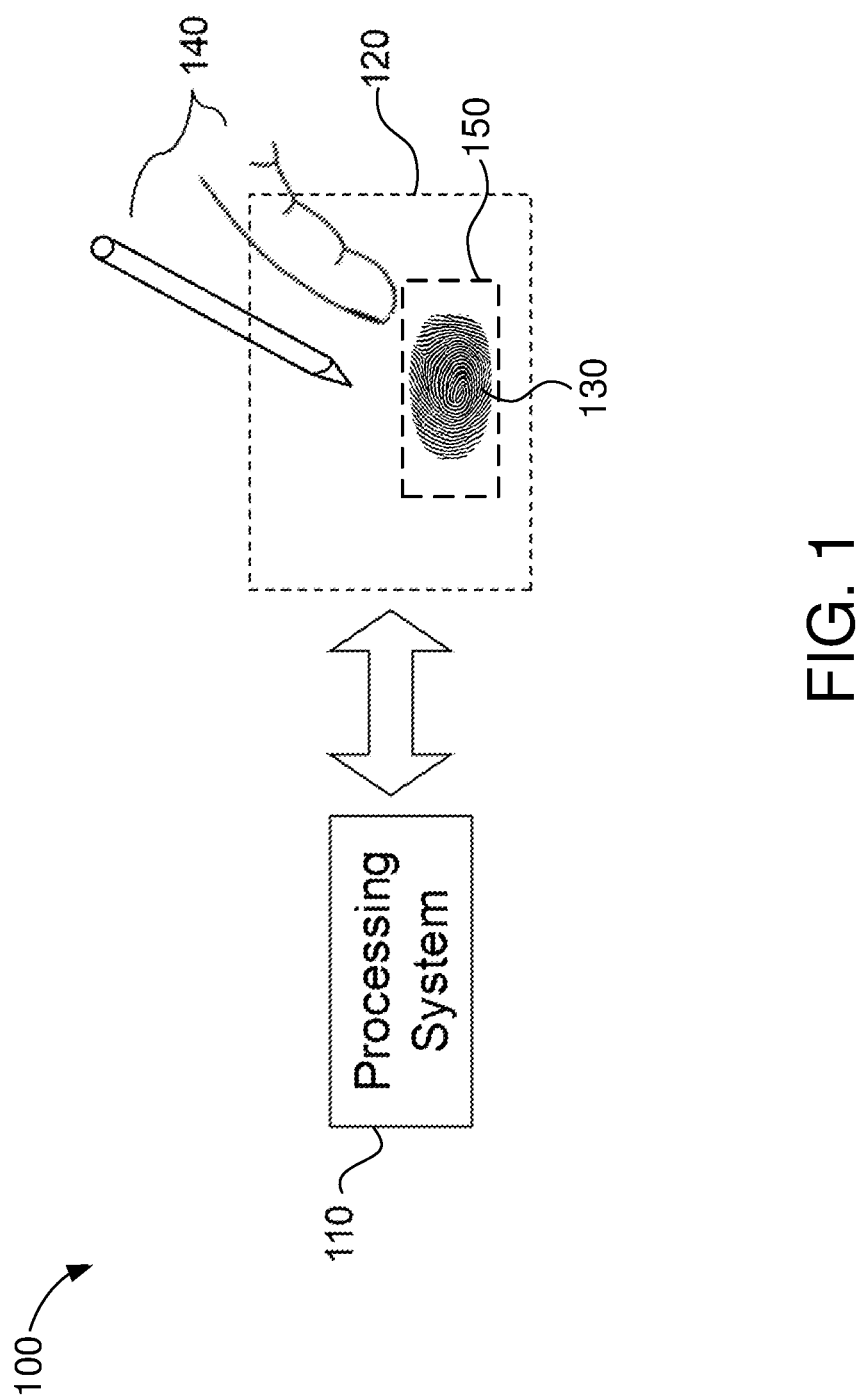
FIG. 1 shows an example input device within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, special-purpose processor, controller, microcontroller, and/or state machine capable of executing scripts or instructions of one or more software programs stored in memory. The term "voltage source," as used herein may refer to a direct-current (DC) voltage source, an alternating-current (AC) voltage source, or any other means of creating an electrical potential (such as ground).

FIG. 1 shows an example input device 100 within which the present embodiments may be implemented. The input device 100 includes a processing system 110 and a sensing region 120. The input device 100 may be configured to provide input to an electronic system (not shown for simplicity). Examples of electronic systems may include personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and media devices (e.g., recorders, editors, and players such as televisions, set-top boxes, music players, digital photo frames, and digital cameras).

In some aspects, the input device 100 may be implemented as a physical part of the corresponding electronic system. Alternatively, the input device 100 may be physically separated from the electronic system. The input device 100 may be coupled to (and communicate with) components of the electronic system using various wired and/or wireless interconnection and communication technologies, such as buses and networks. Examples technologies may include Inter-Integrated Circuit ($I^2C$), Serial Peripheral Interface (SPI), PS/2, Universal Serial bus (USB), Bluetooth®, Infrared Data Association (IrDA), and various radio frequency (RF) communication protocols defined by the IEEE 802.11 standard.

In the example of FIG. 1, the input device 100 may correspond to a proximity sensor device (e.g., also referred to as a "touchpad" or "touch sensor device") configured to sense input provided by one or more input objects 140 in the sensing region 120. Example input objects 140 include fingers, styli, and the like. The sensing region 120 may encompass any space above, around, in, and/or proximate to the input device 100 in which the input device 100 is able to detect user input (such as provided by one or more input objects 140). The size, shape, and/or location of the sensing region 120 (e.g., relative to the electronic system) may vary depending on actual implementations.

In some embodiments, the sensing region 120 may extend from a surface of the input device 100 in one or more directions in space, for example, until a signal-to-noise ratio (SNR) of the sensors falls below a threshold suitable for object detection. For example, the distance to which the sensing region 120 extends in a particular direction may be on the order of less than a millimeter, millimeters, centimeters, or more, and may vary with the type of sensing technology used and/or accuracy desired. In some embodiments, the sensing region 120 may detect inputs involving no physical contact with any surfaces of the input device 100, contact with an input surface (e.g., a touch surface and/or screen) of the input device 100, contact with an input surface of the input device 100 coupled with some amount of applied force or pressure, and/or any combination thereof.

In some embodiments, input surfaces may be provided by, and/or projected on, one or more surfaces of a housing of the input device 100 (e.g., as an image). For example, the sensing region 120 may have a rectangular shape when projected onto an input surface of the input device 100. In some aspects, inputs may be provided through images spanning one, two, three, or higher dimensional spaces in the sensing region 120. In some other aspects, inputs may be provided through projections along particular axes or planes in the sensing region 120. Still further, in some aspects, inputs may be provided through a combination of images and projections in the sensing region 120.

The input device 100 may utilize various sensing technologies to detect user input. Example sensing technologies may include capacitive, elastive, resistive, inductive, magnetic, acoustic, ultrasonic, thermal, and optical sensing technologies. In some embodiments, the input device 100 may utilize capacitive sensing technologies to detect user inputs. For example, the sensing region 120 may include one or more capacitive sensing elements (e.g., sensor electrodes) to create an electric field. The input device 100 may detect inputs based on changes in capacitance of the sensor electrodes. For example, an object in contact with (or close proximity to) the electric field may cause changes in the voltage and/or current in the sensor electrodes. Such changes in voltage and/or current may be detected as "signals" indicative of user input. The sensor electrodes may be arranged in arrays or other configurations to detect inputs at multiple points within the sensing region 120. In some aspects, some sensor electrodes may be ohmically shorted together to form larger sensor electrodes. Some capacitive sensing technologies may utilize resistive sheets that provide a uniform layer of resistance.

Example capacitive sensing technologies may be based on "self-capacitance" (also referred to as "absolute capacitance") and/or "mutual capacitance" (also referred to as "transcapacitance"). Absolute capacitance sensing methods detect changes in the capacitive coupling between sensor electrodes and an input object. For example, an input object near the sensor electrodes may alter the electric field near the sensor electrodes, thus changing the measured capacitive coupling. In some embodiments, the input device 100 may implement absolute capacitance sensing by modulating sensor electrodes with respect to a reference voltage and detecting the capacitive coupling between the sensor electrodes and input objects. The reference voltage may be substantially constant or may vary. In some aspects, the reference voltage may correspond to a ground potential.

Transcapacitance sensing methods detect changes in the capacitive coupling between sensor electrodes. For example, an input object near the sensor electrodes may alter the electric field between the sensor electrodes, thus changing the measured capacitive coupling of the sensor electrodes. In some embodiments, the input device 100 may implement transcapacitance sensing by detecting the capacitive coupling between one or more "transmitter" sensor electrodes and one or more "receiver" sensor electrodes. Transmitter sensor electrodes may be modulated relative to the receiver sensor electrodes. For example, the transmitter sensor electrodes may be modulated relative to a reference voltage to transmit signals, while the receiver sensor electrodes may be held at a relatively constant voltage to "receive" the transmitted signals. The signals received by the receiver sensor electrodes may be affected by environmental interference (e.g., from other electromagnetic signals and/or objects in contact with, or in close proximity to, the sensor electrodes). In some aspects, each sensor electrode may either be a dedicated transmitter or a dedicated receiver. In other aspects, each sensor electrode may be configured to transmit and receive.

The processing system 110 may be configured to operate the hardware of the input device 100 to detect input in the sensing region 120. In some embodiments, the processing system 110 may control one or more sensor electrodes to detect objects in the sensing region 120. For example, the processing system 110 may be configured to transmit signals via one or more transmitter sensor electrodes and receive signals via one or more receiver sensor electrodes. In some aspects, one or more components of the processing system 110 may be co-located, for example, in close proximity to the sensing elements of the input device 100. In other aspects, one or more components of the processing system 110 may be physically separated from the sensing elements of the input device 100. For example, the input device 100 may be a peripheral coupled to a computing device, and the processing system 110 may be implemented as software executed by a central processing unit (CPU) of the computing device. In another example, the input device 100 may be physically integrated in a mobile device, and the processing system 110 may correspond, at least in part, to a CPU of the mobile device.

In some embodiments, the processing system 110 may be implemented as a set of modules that are implemented in firmware, software, or a combination thereof. Example modules include hardware operation modules for operating hardware such as sensor electrodes and display screens; data processing modules for processing data such as sensor signals and positional information; and reporting modules for reporting information. In some embodiments, the processing system 110 may include sensor operation modules configured to operate sensing elements to detect user input in the sensing region 120; identification modules configured to identify gestures such as mode changing gestures; and mode changing modules for changing operation modes of the input device 100 and/or electronic system.

The input device 100 may include additional input components that can be operated by the processing system 110 or another processing system. In some embodiments, the additional input components may include one or more biometric sensors (not shown for simplicity) that may be used to authenticate a user of the input device 100 and/or the corresponding electronic system. For example, a fingerprint sensor may use capacitive and/or optical fingerprint imaging technologies to detect and/or analyze a user's fingerprint in a fingerprint scanning region 150. In some aspects, the fingerprint scanning region 150 may coincide with, or substantially overlap, the sensing region 120.

The processing system 110 may respond to user input in the sensing region 120 and/or fingerprint scanning region 150 by triggering one or more actions. Example actions include changing an operation mode of the input device 100 and/or graphical user interface (GUI) actions such as cursor movement, selection, menu navigation, and the like. In some embodiments, the processing system 110 may determine positional information for a detected input. The term "positional information," as used herein, refers to any information describing or otherwise indicating a position or location of the detected input (e.g., within the sensing region 120). Example positional information may include absolute position, relative position, velocity, acceleration, and/or other types of spatial information. In some embodiments, the processing system 110 may provide information about the detected input to the electronic system (e.g., to a CPU of the electronic system). The electronic system may then process information received from the processing system 110 to carry out additional actions (e.g., changing a mode of the electronic system and/or GUI actions).

The processing system 110 may operate the sensing elements of the input device 100 to produce electrical signals indicative of input (or lack of input) in the sensing region 120 and/or fingerprint scanning region 150. The processing system 110 may perform any appropriate amount of processing on the electrical signals to translate or generate the information provided to the electronic system. For example, the processing system 110 may digitize analog signals received via the sensor electrodes and/or perform filtering or conditioning on the received signals. In some aspects, the processing system 110 may subtract or otherwise account for a "baseline" associated with the sensor electrodes. For example, the baseline may represent a state of the sensor electrodes when no user input is detected. Accordingly, the information provided by the processing system 110 to the electronic system may reflect a difference between the signals received from the sensor electrodes and a baseline associated with each sensor electrode.

In some embodiments, the input device 100 may include a touch screen interface (e.g., display screen) that at least partially overlaps the sensing region 120. For example, the sensor electrodes of the input device 100 may form a substantially transparent overlay on the display screen, thereby providing a touch screen interface for the associated electronic system. The display screen may be any type of dynamic display capable of displaying a visual interface to a user. Examples of suitable display screen technologies may include light emitting diode (LED), organic LED (OLED), cathode ray tube (CRT), liquid crystal display (LCD), plasma, electroluminescence (EL), or other display technology.

In some embodiments, the input device 100 may share physical elements with the display screen. For example, one or more of the sensor electrodes may be used in displaying the interface and sensing inputs. More specifically, a sensor electrode used for sensing inputs may also operate as a display electrode used for displaying at least a portion of the interface. In some embodiments, the input device 100 may include a first sensor electrode configured for displaying at least part of the interface and sensing inputs, and a second sensor electrode may be configured for input sensing only. For example, the second sensor electrode may be disposed between substrates of the display device or may be external to the display device.

In some aspects, the display screen may be controlled or operated, at least in part, by the processing system 110. The processing system 110 may be configured to execute instructions related to sensing inputs and displaying the interface. For example, the processing system 110 may drive a display electrode to display at least a portion of the interface and sense user inputs, concurrently. In another example, the processing system 110 may drive a first display electrode to display at least a portion of the interface while concurrently driving a second display electrode to sense user inputs.

As described above, fingerprint sensors typically require a user to press his/her finger onto the input surface (e.g., the fingerprint scanning region 150) of the input device 100. The contact between the user's finger and the input surface may leave a residual fingerprint 130 in the fingerprint scanning region 150 (e.g., from oil, sweat, or other residue on the user's finger). If the residual fingerprint 130 includes sufficient details and/or information about the user's fingerprint, the fingerprint sensor may be spoofed into authenticating an unauthorized user of the input device 100.

Aspects of the present disclosure provide a method and apparatus for distinguishing residual fingerprints from an actual finger being scanned. In some embodiments, the processing system 110 may reject a verification image during a fingerprint scanning operation if the verification image is too similar (e.g., does not meet a threshold difference requirement) to a prior verification image acquired by the same fingerprint sensor. For example, aspects of the present disclosure recognize that the likelihood of a user's finger landing in the exact same position and orientation, within the fingerprint scanning region 150, during two or more fingerprint scanning operations is very low. Thus, in some aspects, the processing system 110 may look for movement (e.g., at least a threshold change in position and/or orientation) of the detected fingerprint between two or more verification images.

Aspects of the present disclosure further recognize that the state of the input surface may change between the times at which consecutive fingerprint scanning operations are performed. For example, environmental factors (e.g., evaporation, condensation, fading, smearing, etc.) may cause movements in the residual fingerprint 130 itself. As a result, the residual fingerprint 130 may appear to have "moved" slightly from the time a first verification image is captured to the time a second verification image is captured. It is also noted that a verified user is likely to leave additional fingerprints on the input surface when operating the input device 100 via touch inputs (e.g., after being successfully authenticated by a fingerprint scanning operation). As a result, the fingerprint scanning region 150 may have additional residual fingerprints, when the second verification image is captured, that were not present in the first verification image. Thus, in some embodiments, the processing system 110 may capture additional images of the fingerprint scanning region 150 (e.g., between successive scanning operations) to ensure that the fingerprint detected in a verification image is sufficiently different than any residual fingerprints that may have been present in the fingerprint scanning region 150 prior to authentication.

Among other advantages, the embodiments described herein may prevent fingerprint sensors from being spoofed by residual fingerprints left on the input surface of the input device (e.g., in the fingerprint scanning region 150). More specifically, by comparing the current verification image to a previous verification image, aspects of the present disclosure may ensure that any fingerprint(s) detected during the current fingerprint scanning operation were not leftover (e.g., as residual fingerprints) from a prior fingerprint scanning operation. Furthermore, by augmenting the previous verification image with updated images of the fingerprint scanning region 150, the example embodiments may ensure that any changes to the state of the input surface, prior to performing the current fingerprint scanning operation, are reflected in the comparison.

Figure 2:
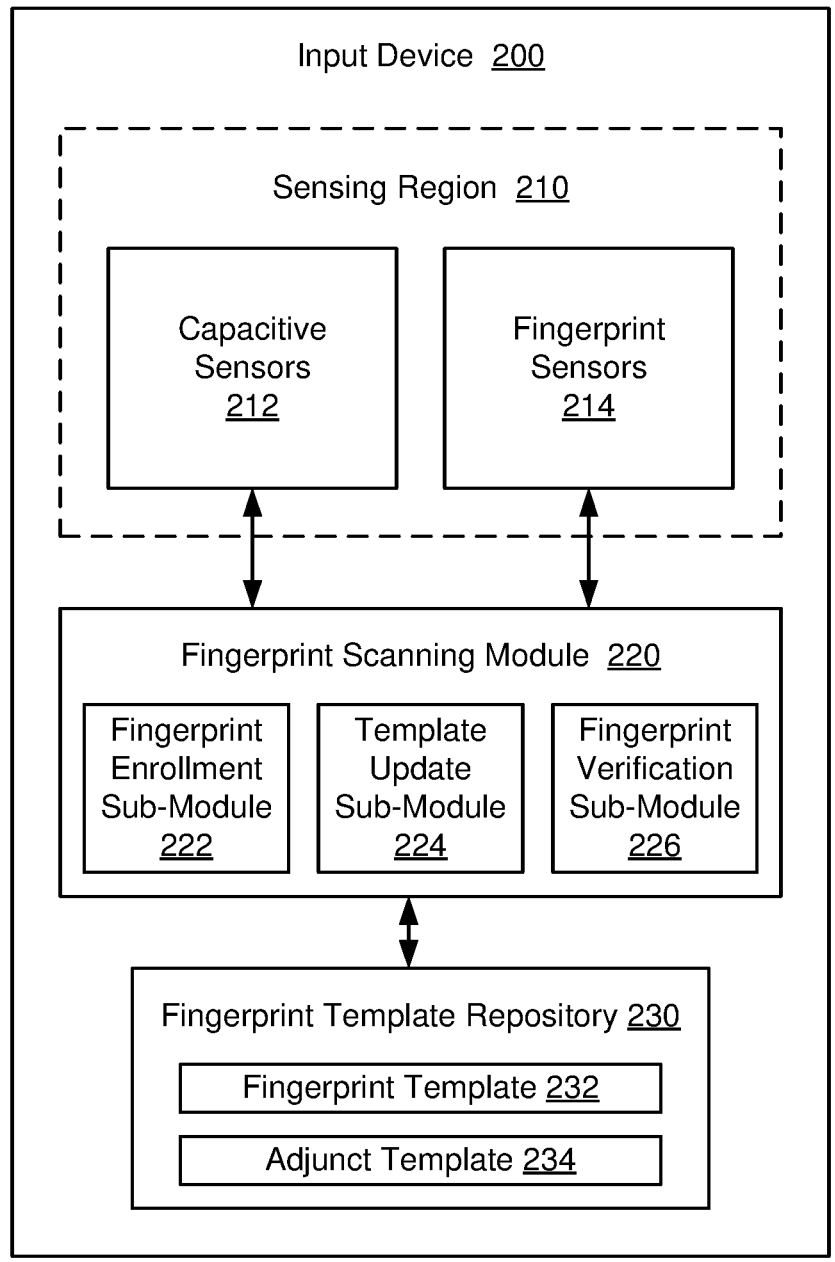
FIG. 2 shows a block diagram of an input device capable of distinguishing residual fingerprints, in accordance with some embodiments.

FIG. 2 shows a block diagram of an input device 200 capable of distinguishing residual fingerprints, in accordance with some embodiments. The input device 200 includes a sensing region 210, a fingerprint scanning module 220, and a fingerprint template repository 230. The sensing region 210 may encompass any space above, around, in, and/or proximate to the input device 200 in which the input device 200 is able to detect user input, such as provided by one or more input objects (not shown for simplicity). The size, shape, and/or location of the sensing region 210 may vary depending on actual implementations.

In some embodiments, the sensing region 210 includes, or is otherwise coupled to, a set of capacitive sensors 212 and fingerprint sensors 214. For example, the capacitive sensors 212 may include an array of sensor electrodes that create an electric field in and/or around the sensing region 210. The input device 200 may detect inputs based on changes in capacitance of the sensor electrodes and/or the electric field. The fingerprints sensors 214 may use capacitive and/or optical fingerprint imaging technologies to scan or image a user's finger in the sensing region 210. In some embodiments, the fingerprint sensors 214 may include an array of active pixel sensors (e.g., photodiodes, CMOS image sensor arrays, CCD arrays, and/or any other sensors capable of detecting wavelengths of light in the visible spectrum, the infrared spectrum, or the ultraviolet spectrum) that are used for capturing high resolution images, such as required for fingerprint scanning. While specific embodiments may be described with respect to optical fingerprint sensors, the embodiments herein may be implemented in capacitive fingerprint sensors, ultrasonic fingerprint sensors, thermal fingerprint sensors, or the like, with little or no modification.

The capacitive sensors 212 and fingerprint sensors 214 are coupled to the fingerprint scanning module 220. The fingerprint scanning module 220 may be implemented by, or include at least a portion of, a processing system (such as processing system 110) that controls an operation of the fingerprint sensors 214 and/or capacitive sensors 212. The fingerprint scanning module 220 may operate the fingerprint sensors 214 to scan (e.g., capture an image of) a user's fingerprint and authenticate the user based on the fingerprint scan. In some embodiments, the fingerprint scanning module 220 may prevent residual fingerprints in the sensing region 210 from interfering with the fingerprint scanning operation. For example, the fingerprint scanning module 220 may prevent the residual fingerprints from being re-imaged and used to validate an unauthorized user. More specifically, when performing a fingerprint scanning operation, the fingerprint scanning module 220 may ensure that the scanned fingerprint being analyzed for authentication purposes is from a finger physically in contact with the sensing region 210 (e.g., a "bonafide" fingerprint) and not a residual fingerprint left over from a previous fingerprint scan and/or user contact with the sensing region 210.

In some embodiments, the fingerprint scanning module 220 may include a fingerprint enrollment sub-module 222, a template update sub-module 224, and a fingerprint verification sub-module 226. The fingerprint enrollment sub-module 222 may enroll one or more fingerprints of an authorized user (e.g., during an initial set-up or enrollment process) to be used for subsequent fingerprint authentication. For example, the fingerprint enrollment sub-module 222 may capture one or more images of the user's finger, in various positions and/or orientations, while pressed against an input surface (e.g., coinciding with the sensing region 210) of the input device 200. In some embodiments, the fingerprint enrollment sub-module 222 may analyze identifying features of the user's fingerprints from the captured images and may generate a fingerprint template 232 for the user (e.g., which may include the captured images) based on the analysis. For example, the identifying features may include a pattern of ridges and valleys on the surface of the user's finger. The fingerprint template 232 may be stored in the fingerprint template repository 230.

The template update sub-module 224 may acquire updated information from the fingerprint sensors 214 to supplement the information stored in the fingerprint template repository 230. More specifically, the template update sub-module 224 may record the presence of any residual fingerprints on the input surface which may interfere with a subsequent fingerprint authentication operation. In some embodiments, the template update sub-module 224 may acquire the updated information from a verification image captured by the fingerprint sensors 214 during a fingerprint authentication operation. For example, the verification image may correspond to an image of the sensing region 210 (or at least a portion thereof) including the input object (e.g., user's finger) that triggered the authentication operation. In some aspects, the template update sub-module 224 may analyze a position and/or orientation of one or more fingerprints detected in the verification image, and may generate an adjunct template 234 (e.g., which may include the verification image) based on the analysis. The adjunct template 234 may be stored in the fingerprint template repository 230.

In some embodiments, the template update sub-module 224 may further update the adjunct template 234 to reflect any changes to the state of the sensing region 210 and/or input surface since the last verification image was acquired. For example, the template update sub-module 224 may attempt to capture any and all residual fingerprints that may have accumulated on the input surface prior to a subsequent fingerprint authentication operation, but are not reflected in the previous verification image. Thus, the template update sub-module 224 may operate the fingerprint sensors 214 to capture update images of the sensing region 210 (or at least a portion thereof) independent of any fingerprint enrollment or authentication operation. In some embodiments, the template update sub-module 224 may analyze a position and/or orientation of one or more fingerprints detected in the update images, and may update the adjunct template 234 (e.g., which may include the update images) based on the analysis. In some aspects, the template update sub-module 224 may store each update image in the adjunct template 234. In other aspects, the template update sub-module 224 may store only the most recent update image in the adjunct template 234 (e.g., replacing any previously-stored images).

In some embodiments, the template update sub-module 224 may acquire the update images periodically (e.g., every 5 minutes) and/or at predetermined times. In some other embodiments, the template update-sub-module 224 may acquire the update images when a transition event has occurred. For example, a transition event may indicate that the electronic system has not been used or operated by the authorized user for some time and/or is likely to require fingerprint authentication upon subsequent use. Example transition events may include, but are not limited to: powering down the display and/or locking the electronic system; the electronic system remaining idle and/or still for a threshold amount of time; detecting a user's finger in contact with or proximate to (e.g., hovering over) the sensing region 210; detecting a change in position and/or orientation of the electronic system via an accelerometer; detecting a change in light from an ambient light sensor; and detecting that a button has been depressed.

The fingerprint verification sub-module 226 may analyze a verification image captured during a fingerprint authentication operation to determine whether the verification image includes a valid fingerprint belonging to an authorized user of the input device 200. In some aspects, the fingerprint verification sub-module 226 may trigger the fingerprint sensors 214 to capture the verification image when an authentication event is triggered (e.g., when a finger or input object makes contact with a portion of the sensing region 210 coinciding with the fingerprint sensors 214). In some embodiments, the fingerprint verification sub-module 226 may use the information stored in the fingerprint repository 230 to determine whether to authenticate the user associated with the verification image.

For example, the fingerprint verification sub-module 226 may compare the verification image to the fingerprint template 232 to determine whether the verification image includes a verified fingerprint. In some aspects, the fingerprint verification sub-module 226 may detect the presence of a verified fingerprint if the fingerprint information and/or enrollment images included with the fingerprint template 232 matches fingerprint information from the verification image (e.g., regardless of position or orientation). In some implementations, the fingerprint verification sub-module 226 may use existing or known fingerprint matching techniques to determine a measure of similarity between the verification image and the fingerprint template 232. If a verified fingerprint cannot be detected from the verification image (e.g., the "match score" is below a threshold level), the fingerprint verification sub-module 226 may prevent the user from accessing or operating the corresponding electronic system.

As described above, residual fingerprints left over by an authorized user may spoof some fingerprint scanners into authenticating an unauthorized user. Thus, in some embodiments, the fingerprint verification sub-module 226 may perform additional analysis on the verification image before and/or after a verified fingerprint has been detected. For example, the fingerprint verification sub-module 226 may further compare the verification image to the adjunct template 234 to determine whether the verified fingerprint is attributed to physical presentation of an actual user's finger or a residual fingerprint. In some aspects, the fingerprint verification sub-module 226 may determine whether the verified fingerprint is substantially different than any fingerprint information in the adjunct template 234. For example, it is noted that the likelihood of a user's finger landing multiple times (e.g., in the sensing region 210) in the same position and orientation is very low. Thus, the fingerprint verification sub-module 226 may detect movement of the verified fingerprint when comparing the verification image to the adjunct template 234.

In some implementations, the fingerprint verification sub-module 226 may use existing or known fingerprint matching techniques to determine a measure of similarity between the verification image and the adjunct template 234. In some embodiments, the fingerprint verification sub-module 226 may compare the verification image to each image included with the adjunct template 234 (e.g., including the previous verification image and each update image acquired since) and/or fingerprint information associated therewith. Notably, various environmental factors (e.g., evaporation, condensation, fading, smearing, etc.) may cause slight changes or apparent movement in one or more residual fingerprints on the input surface. Thus, changes and/or movements of the residual fingerprints may be tracked over time, and/or changes and/or movements of the residual fingerprints may be tracked algorithmically and certain changes and/or movements may be rejected. In some embodiments, the changes and/or movements may be compared to a threshold.

For example, while a residual fingerprint from a later image may appear substantially similar to the verified fingerprint, the same residual fingerprint from an earlier image may appear substantially different than the verified fingerprint. Thus, when compared to the later image, the verified fingerprint may be classified as a residual fingerprint. However, when compared to the earlier image, the verified fingerprint may be classified as a bonafide fingerprint (e.g., since the verified fingerprint appears to have moved). Thus, in some embodiments, the fingerprint verification sub-module 226 may authenticate the user if and only if the verified fingerprint is substantially different than each of the images included in the adjunct template 234 (e.g., the "similarity score" is below a threshold level). If at least one of the images in the adjunct template shares a threshold amount of similarity with the verified fingerprint, the fingerprint verification sub-module 226 may prevent the user from accessing or operating the corresponding electronic system.

In some other embodiments, the fingerprint verification sub-module 226 may compare the verification image to only the most recently-acquired image in the adjunct template 234 (e.g., which may also be the only image included in the adjunct template 234) and/or fingerprint information associated therewith. For example, it may be assumed that any residual fingerprints detected in earlier images will still be present in later images or are no longer relevant (e.g., no longer resemble the verified fingerprint). Thus, the fingerprint verification sub-module 226 may authenticate the user if the verified fingerprint is substantially different than the most recent image included in the adjunct template 234 (e.g., the similarity score is below a threshold level). If the most recent image shares a threshold amount of similarity with the verified fingerprint, the fingerprint verification sub-module 226 may prevent the user from accessing or operating the corresponding electronic system. In other embodiments, the fingerprint verification sub-module 226 may compare the verification image to images captured during a period of time in the adjunct template 234, or to a number of n images in the adjunct template 234.

Figure 3:
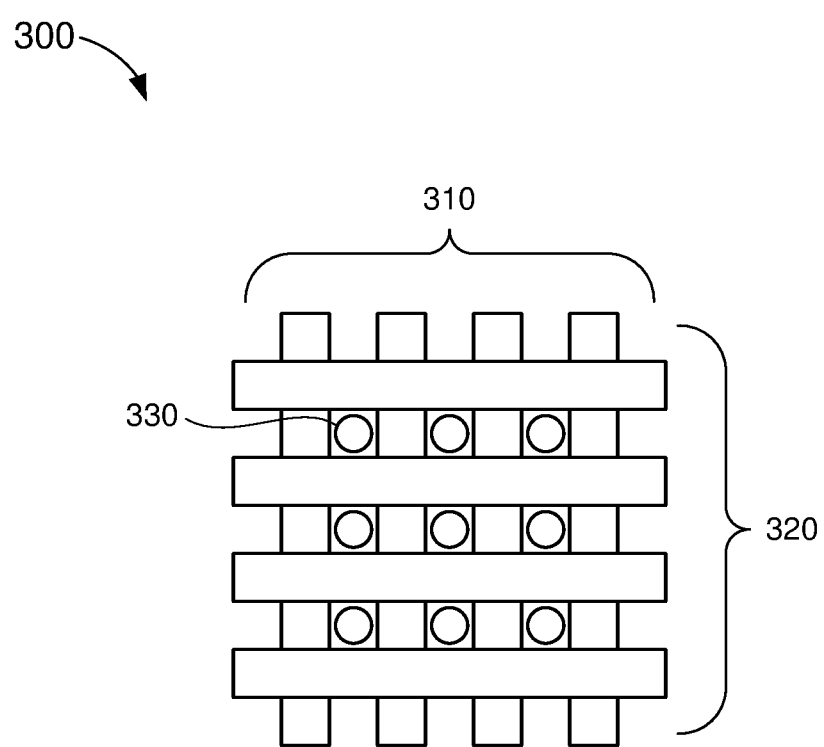
FIG. 3 shows an example sensor configuration that may be used for fingerprint authentication, in accordance with some embodiments.

FIG. 3 shows an example sensor configuration 300 that may be used for fingerprint authentication, in accordance with some embodiments. The sensor configuration 300 includes a capacitive sensor array formed by a number of sensor electrodes 310 arranged in a vertical pattern and a number of sensor electrodes 320 arranged in a horizontal pattern. The sensor configuration 300 further includes a number of optical sensing elements 330 provided between the sensor electrodes 310 and 320. In some embodiments, the sensor configuration 300 may represent at least a portion of the sensing region 210 of FIG. 2 and/or the fingerprint scanning region 150 of FIG. 1. Accordingly, the sensor electrodes 310 and 320 may correspond to one or more of the capacitive sensors 212 and the optical sensing elements 330 may correspond to one or more of the fingerprint sensors 214.

In the example of FIG. 3, sensor electrodes 310 are shown to extend in a first (e.g., vertical) direction and sensor electrodes 320 are shown to extend in a second (e.g., horizontal) direction. Although the sensor electrodes 310 and 320 are depicted in a perpendicular grid arrangement, in actual implementations the sensor electrodes 310 and 320 may be arranged in other patterns. For example, in other embodiments, the sensor electrodes 310 may be parallel or diagonal to the sensor electrodes 320. Furthermore, each of the sensor electrodes 310 and 320 is shown to have substantially the same shape and size. However, in actual implementations the sensor electrodes 310 and 320 may be of various shapes and/or sizes. As discussed above with respect to FIGS. 1 and 3, sensor electrodes 310 and 320 may be transparent. Further, with respect to FIG. 3, sensor electrodes 310 and 320 may cover or overlap optical sensing elements 330. In addition, the resolution of the sensor electrodes 310 and 320 may be different from the resolution of the optical sensing elements 330.

The sensor electrodes 310 and 320 may detect touch inputs in the sensing region using capacitive sensing techniques. For example, in some implementations, one or more of the sensor electrodes 310 and 320 may be driven with modulated signals to determine changes in the absolute capacitance of the sensor electrodes (e.g., absolute capacitive sensing). In other implementations, a first sensor electrode (e.g., of the sensor electrodes 310 or 320) may be driven with a transmitter signal and a resulting signal may be received on a second sensor electrode (e.g., of the sensor electrodes 310 or 320). Still further, in some implementations, the sensor electrodes 310 and 320 may be configured for a combination of transcapacitance and absolute capacitance sensing. Using capacitive sensing techniques, the sensor electrodes 310 and 320 may detect input objects that are in contact with and/or proximate to the input surface (e.g., such as a finger hovering above the input surface).

The optical sensing elements 330 may generate a high-resolution image of the sensing region (or at least a portion thereof). For example, the optical sensing elements 330 may be used in fingerprint scanning applications to capture images from which fine biometric details may be discerned (such as a pattern of ridges and valleys on the surface of a finger). Thus, the optical sensing elements 330 may detect objects in the sensing region with a higher resolution than the sensor electrodes 310 and 320. However, the optical sensing elements 330 may also consume more power than the sensor electrodes 310 and 320 and may be unable to detect objects that are not in contact with the input surface (e.g., as the SNR of the sensors tapers off significantly with the increase in distance from the input surface).

In some embodiments, an input device may leverage the proximity sensing capabilities of the sensor electrodes 310 and 320 to selectively activate the optical sensing elements 330. As described above, it may be desirable to scan the sensing region just before a fingerprint authentication operation is about to be performed (e.g., to capture any and all residual fingerprints that may have accumulated on the input surface since a previous fingerprint authentication operation). Aspects of the present disclosure recognize that a finger hovering over the input surface is a relatively reliable indicator that the finger is about to make contact with the input surface, and thus a fingerprint authentication operation may be performed. Thus, in some embodiments, the sensor electrodes 310 and 320 (or a processing system coupled thereto) may trigger the optical sensing elements 330 to scan the sensing region (e.g., capture an update image) when the sensor electrodes 310 and 320 detect an input object hovering over (e.g., a threshold proximity from) the input surface. It is noted that the update image should not include the presence of the input object. Thus, in some aspects, the sensor electrodes 310 and 320 (or processing system) may ensure that the update image is captured before the input object makes contact with the input surface.

In some embodiments, the sensor electrodes 310 and 320 (or processing system) may trigger a display of the input device to display a "landing target" for the user's finger. For example, the landing target may indicate a region of the input surface (e.g., the fingerprint scanning region 150) in which the user should place his/her finger to be scanned by the optical sensing elements 330. In some aspects, the landing target may be triggered by activating an always-on-display (AOD) feature of the input device. For example, the AOD feature may correspond to a low-power mode of the display. Accordingly, the display may consume significantly less power when displaying images in the AOD than when fully turned on.

In some implementations, the sensing region of an input device may be large enough to acquire multiple fingerprints concurrently. As a result, images of the sensing region captured by a fingerprint sensor may include one or more bonafide fingerprints, one or more residual fingerprints, or any combination thereof. In some embodiments, when multiple fingerprints are detected, the input device may determine which (if any) of the fingerprints are bonafide and which (if any) of the fingerprints are residual. More specifically, to prevent spoofing, the input device may filter or otherwise distinguish residual fingerprints from bonafide fingerprints in images of the sensing region. In some aspects, the input device may filter the fingerprints such that only bonafide fingerprints are considered for purposes of user authentication. In some other aspects, the input device may apply weights to the fingerprints such that bonafide fingerprints contribute more heavily to the user authentication determination than residual fingerprints.

Figure 4:
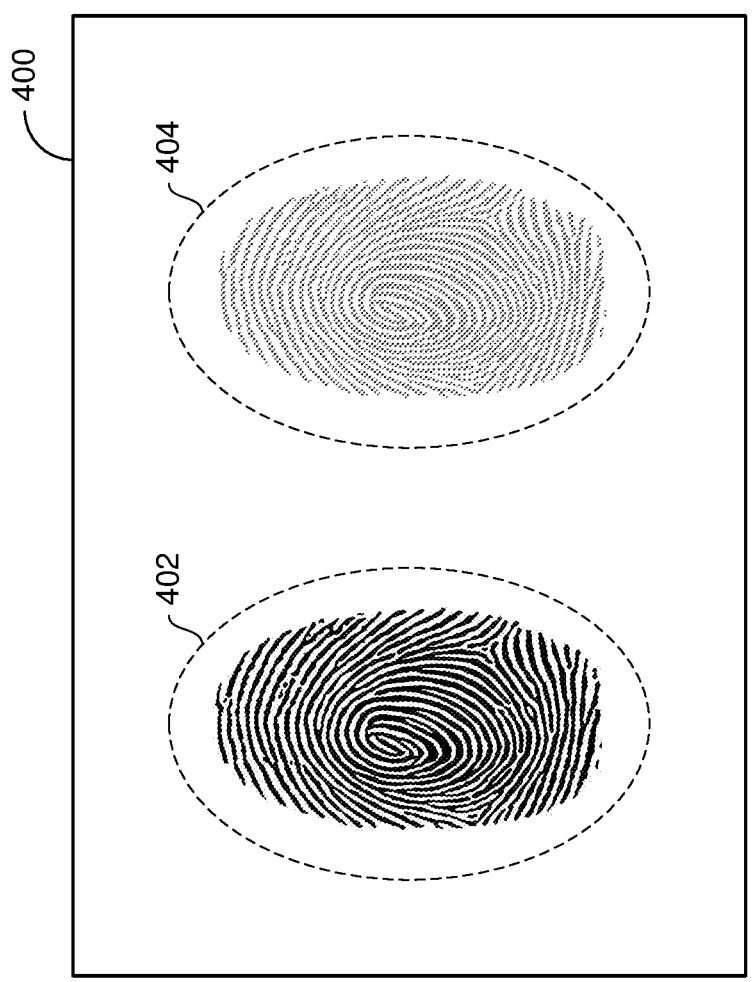
FIG. 4 shows an example image of a sensing region that can be captured by a fingerprint sensor.

FIG. 4 shows an example image 400 of a sensing region that can be captured by a fingerprint sensor. The image 400 may be acquired by an input device such as, for example, the input device 200 of FIG. 2. More specifically, the image 400 may be an example image of the sensing region 210 captured by the fingerprint sensors 214. In some implementations, the image 400 may be a high-resolution optical image captured by one or more light sensing elements (e.g., photodiodes, CMOS image sensor arrays, CCD arrays, and the like), where the amount of light accumulated on each of the light sensing elements is correlated to the ridges and valleys in the user's finger. In some other implementations, the image 400 may be a capacitive image captured by one or more capacitive sensing elements (e.g., sensor electrodes), where the amount of charge accumulated on the capacitive sensing elements is correlated to the ridges and valleys in the user's finger.

In the example of FIG. 4, the first fingerprint 402 may be a bonafide fingerprint and the second fingerprint 404 may be a residual fingerprint. Although only two fingerprints 402 and 404 are depicted in the example of FIG. 4, the image 400 may include any number of bonafide and/or residual fingerprints in actual implementations. In some embodiments, the input device 200 may compare the image 400 with one or more adjunct templates 234 stored in the fingerprint template repository 230 to determine a similarity score for each fingerprint in the image 400. As described above with respect to FIG. 2, a fingerprint may be given a higher similarity score if it appears in substantially the same location and/or orientation in one or more adjunct templates 234. Other metrics also may be used for purposes of calculating a similarity score. On the other hand, a fingerprint may be given a lower similarity score if it appears sufficiently "new" or different than any existing fingerprints in one or more adjunct templates 234. For example, the second fingerprint 404 may be given a higher similarity score than the first fingerprint 402.

In some embodiments, the input device 200 may filter the fingerprints 402 and 404 based, at least in part, on their similarity scores. In some aspects, when processing the image 400, the input device 200 may eliminate one or more fingerprints from further consideration if the similarity score exceeds (or is equal to) a similarity threshold. For example, the input device 200 may eliminate the second fingerprint 404 (e.g., as a residual fingerprint) and use only the first fingerprint 402 for user authentication. By filtering the fingerprints 402 and 404 based on their similarity scores, the input device 200 may ensure that only bonafide fingerprints are considered for user authentication purposes. Thus, if an image contains a bonafide fingerprint from an unauthorized user and a residual fingerprint from an authorized user, and only a single matching fingerprint is required for authentication, the mere presence of an actual fingerprint (e.g., the bonafide fingerprint) will not cause the input device 200 to be spoofed into authenticating the image based on residue from a previous authentication (e.g., the residual fingerprint).

In some other embodiments, the input device 200 may weight the fingerprints 402 and 404 based, at least in part, on their similarity scores. In some aspects, when processing the image 400, the input device 200 may apply different weights to different fingerprints such that fingerprints with higher similarity scores are given a lower weighting than fingerprints with lower similarity scores. For example, the input device 200 may assign a greater weight to the first fingerprint 402 than the second fingerprint 404 when performing user authentication. By weighting the fingerprints 402 and 404 based on their similarity scores, the input device 200 may ensure that bonafide fingerprints contribute more heavily to the authentication determination than residual fingerprints. Thus, when an image contains a bonafide fingerprint and a residual fingerprint, and multiple (e.g., two or more) fingerprints are required for authentication, the residual fingerprint will contribute little (if any) to the authentication determination even when it produces a high match score.

Figure 5A:
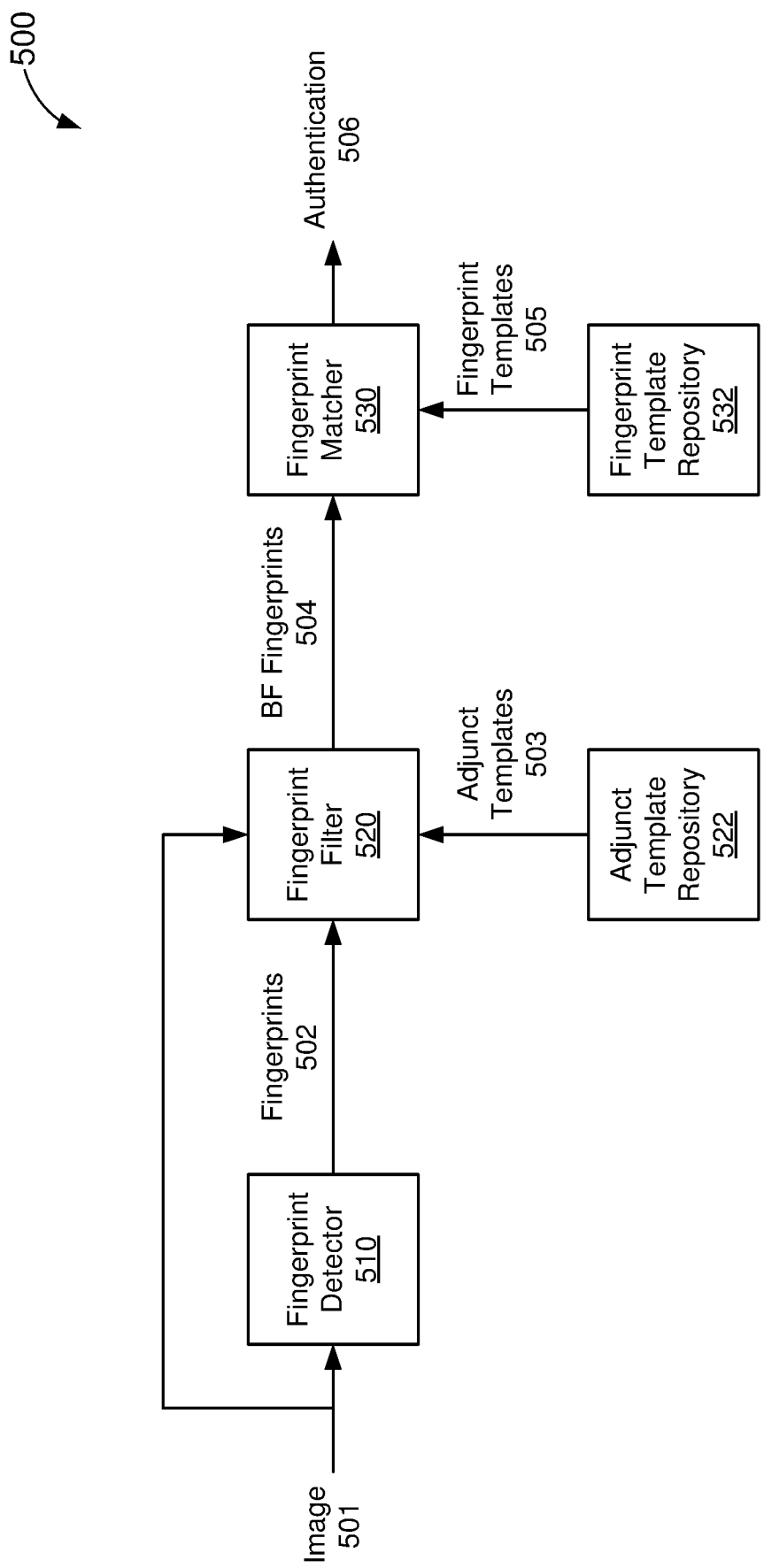
FIG. 5A shows a block diagram of a fingerprint authentication system, in accordance with some embodiments.

FIG. 5A shows a block diagram of a fingerprint authentication system 500, in accordance with some embodiments. The fingerprint authentication system 500 may be an example implementation of the input device 200 of FIG. 2 or, more specifically, the fingerprint verification sub-module 226. Accordingly, the fingerprint authentication system 500 may generate an authentication output 506 based on images 501 acquired via one or more biometric sensors (such as the fingerprint sensors 214 of FIG. 2). The authentication output 506 may indicate whether the image 501 contains one or more bonafide fingerprints belonging to an authorized user of the input device or electronic system (e.g., whether the image 501 is "authenticated").

The fingerprint authentication system 500 includes a fingerprint detector 510, a fingerprint filter 520, and a fingerprint matcher 530. The fingerprint detector 510 is configured to detect one or more fingerprints 502 in the received image 501. In some implementations, the image 501 may be an optical image. In some other implementations, the image 501 may be a capacitive image. With reference for example to FIG. 4, the image 400 may be an example of the image 501 received by the fingerprint detector 510. The fingerprint detector 510 may detect or identify the fingerprints 402 and 404 (e.g., as the fingerprints 502) using neural networks and/or other known fingerprint (or object) detection techniques.

The fingerprint filter 520 is configured to filter the fingerprints 502 detected by the fingerprint detector 510 based, at least in part, on the image 501 and one or more adjunct templates 503 stored in an adjunct template repository 522. The adjunct templates 503 and adjunct template repository 522 may be example implementations of the adjunct template 234 and fingerprint template repository 230, respectively, of FIG. 2. In some embodiments, the fingerprint filter 520 may determine which, if any, of the fingerprints 502 are bonafide (BF) fingerprints 504 by comparing the image 501 to the adjunct templates 503. For example, the fingerprint filter 520 may determine a similarity score for each of the fingerprints 502 based on its level of similarity to existing fingerprints in one or more of the adjunct templates 503. Fingerprints that exceed (or are equal to) a similarity threshold may be filtered or eliminated from further consideration. As a result, only fingerprints with similarity scores below the similarity threshold are provided, as bonafide fingerprints 504, to the fingerprint matcher 530.

The fingerprint matcher 530 is configured to authenticate the image 501 based, at least in part, on the bonafide fingerprints 504 and one or more fingerprint templates 505 stored in a fingerprint template repository 532. The fingerprint templates 505 and fingerprint template repository 532 may be example implementations of the fingerprint template 232 and fingerprint template repository 230, respectively, of FIG. 2. In some embodiments, the fingerprint matcher 530 may determine whether one or more of the bonafide fingerprints 504 belongs to an authorized user by comparing the bonafide fingerprints 504 to the fingerprint templates 505. For example, the fingerprint matcher 530 may determine a match score for each of the bonafide fingerprints 504 based on its level of similarity to one or more of the fingerprint templates 505. In some implementations, the fingerprint matcher 530 may generate an authentication output 506 indicating that the image 501 (or user) is authenticated if the match score for at least one of the bonafide fingerprints 504 exceeds (or is equal to) a matching threshold. In some other implementations, the fingerprint matcher 530 may indicate that the image 501 is authenticated only if a sufficiently high match score is detected for a number (n) of bonafide fingerprints 504.

Figure 5B:
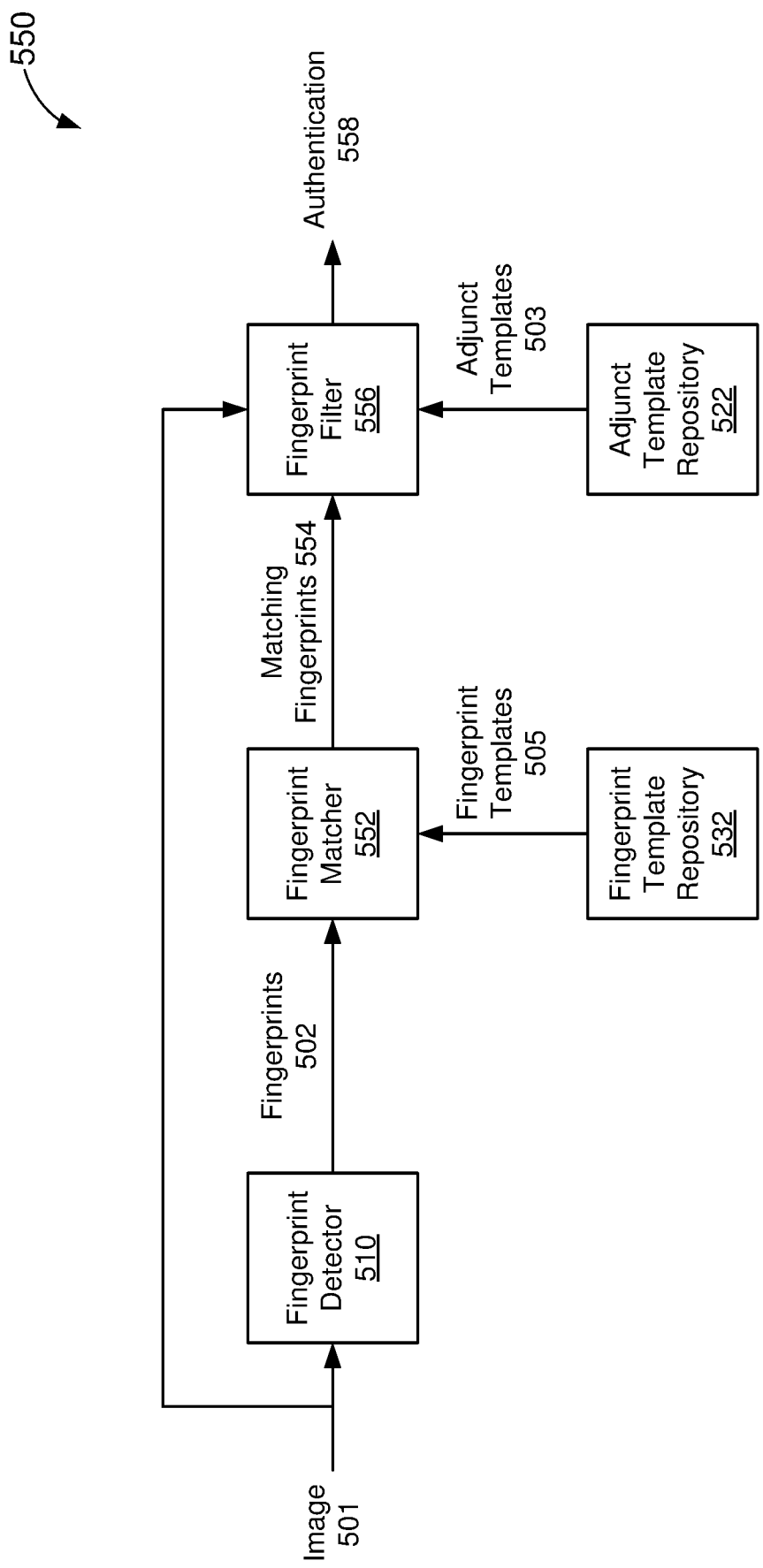
FIG. 5B shows another block diagram of a fingerprint authentication system, in accordance with some embodiments.

FIG. 5B shows another block diagram of a fingerprint authentication system 550, in accordance with some embodiments. The fingerprint authentication system 550 has substantially the same elements as the fingerprint authentication system 500 of FIG. 5A, however, the output of the fingerprint detector 510 is provided as input to a fingerprint matcher 552 and the output of the fingerprint matcher 552 is provided as input to a fingerprint filter 556. The fingerprint matcher 552 and fingerprint filter 556 may be respective examples of the fingerprint matcher 530 and fingerprint filter 520 of FIG. 5A. Thus, in the embodiment of FIG. 5B, the fingerprint authentication system 550 looks for matching fingerprints before filtering residual fingerprints from bonafide fingerprints.

The fingerprint matcher 552 may identify one or more matching fingerprints 554 among the detected fingerprints 502 based, at least in part, on the fingerprint templates 505 stored in the fingerprint template repository 532. In some embodiments, the fingerprint matcher 552 may determine whether one or more of the fingerprints 502 belongs to an authorized user by comparing the fingerprints 502 to the fingerprint templates 505. For example, the fingerprint matcher 552 may determine a match score for each of the fingerprints 502 based on its level of similarity to one or more of the fingerprint templates 505. In some implementations, the fingerprint matcher 552 may output a matching fingerprint 554 only if the match score for a corresponding fingerprint 502 exceeds (or is equal to) a matching threshold.

The fingerprint filter 556 may filter the matching fingerprints 554 based, at least in part, on the image 501 and the adjunct templates 503 stored in the adjunct template repository 522. In some embodiments, the fingerprint filter 556 may determine which, if any, of the matching fingerprints 554 are bonafide fingerprints by comparing the image 501 to the adjunct templates 503. For example, the fingerprint filter 556 may determine a similarity score for each of the matching fingerprints 554 based on its level of similarity to existing fingerprints in one or more of the adjunct templates 503. In some implementations, the fingerprint filter 556 may generate an authentication output 558 indicating that the image 501 (or user) is authenticated if at least one of the matching fingerprints 554 is a bonafide fingerprint. In some other implementations, the fingerprint filter 556 may indicate that the image 501 is authenticated only if a threshold number (n) of matching fingerprints 554 are bonafide fingerprints.

Figure 6:
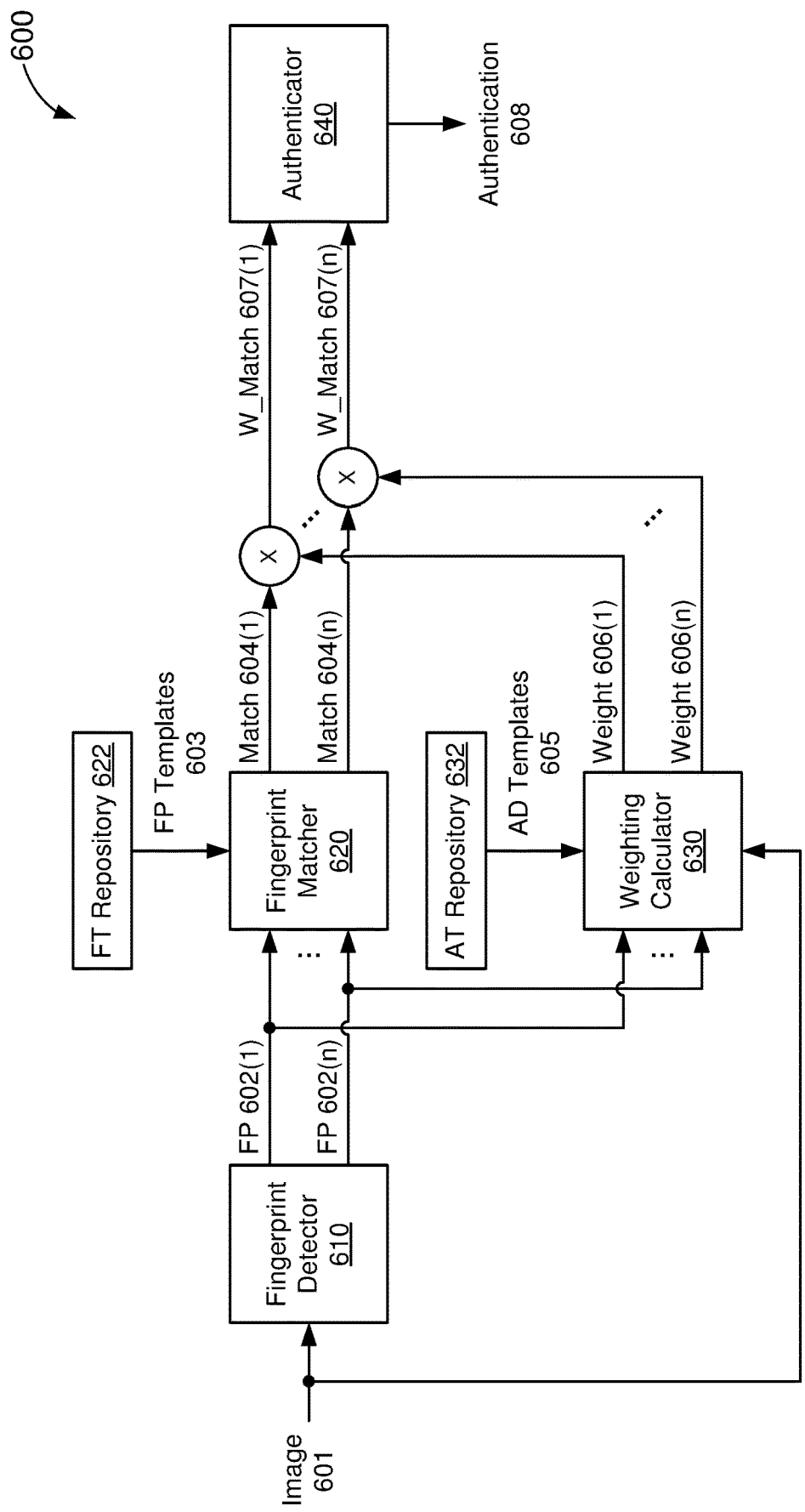
FIG. 6 shows another block diagram of a fingerprint authentication system, in accordance with some embodiments.

FIG. 6 shows another block diagram of a fingerprint authentication system 600, in accordance with some embodiments. The fingerprint authentication system 600 may be an example implementation of the input device 200 of FIG. 2 or, more specifically, the fingerprint verification sub-module 226. Accordingly, the fingerprint authentication system 600 may generate an authentication output 608 based on images 601 acquired via one or more biometric sensors (such as the fingerprint sensors 214 of FIG. 2). The authentication output 608 may indicate whether the image 601 contains one or more bonafide fingerprints belonging to an authorized user of the input device or electronic system.

The fingerprint authentication system 600 includes a fingerprint detector 610, a fingerprint matcher 620, a weighting calculator 630, and an authenticator 640. The fingerprint detector 610 is configured to detect a number (n) of fingerprints (FP) $602(1)$-$602(n)$ in the received image 601. In some implementations, the image 601 may be an optical image. In some other implementations, the image 601 may be a capacitive image. With reference for example to FIG. 4, the image 400 may be an example of the image 601 received by the fingerprint detector 610. The fingerprint detector 610 may detect or identify the fingerprints 402 and 404 (e.g., as the fingerprints $602(1)$-$602(n)$) using neural networks and/or other known fingerprint (or object) detection techniques.

The fingerprint matcher 620 is configured to determine a respective match score $604(1)$-$604(n)$ for each of the detected fingerprints $602(1)$-$602(n)$ based, at least in part, on one or more fingerprint (FP) templates 603 stored in a fingerprint template (FT) repository 622. The fingerprint templates 603 and fingerprint template repository 622 may be example implementations of the fingerprint template 232 and fingerprint template repository 230, respectively, of FIG. 2. In some embodiments, the fingerprint matcher 620 may determine the match scores $604(1)$-$604(n)$ based on the level of similarity of the fingerprints $602(1)$-$602(n)$, respectively, to one or more of the fingerprint templates 603.

The weighting calculator 630 is configured to determine a respective weight $606(1)$-$606(n)$ for each of the detected fingerprints $602(1)$-$602(n)$ based, at least in part, on the image 601 and one or more adjunct (AD) templates 605 stored in an adjunct template (AT) repository 632. The adjunct templates 605 and adjunct template repository 632 may be example implementations of the adjunct template 234 and fingerprint template repository 230, respectively, of FIG. 2. In some embodiments, the weighting calculator 630 may determine the weights $606(1)$-$606(n)$ for the fingerprints $602(1)$-$602(n)$, respectively, by comparing the image 601 to the adjunct templates 605. For example, the weighting calculator 630 may determine a similarity score for each of the fingerprints $602(1)$-$602(n)$ based on its level of similarity to existing fingerprints in one or more of the adjunct templates 605. Fingerprints with higher similarity scores may be given lower weights than fingerprints with lower similarity scores. In other words, the weights $606(1)$-$606(n)$ may be inversely proportional to the similarity scores for the fingerprints $602(1)$-$602(n)$.

The weights $606(1)$-$606(n)$ are combined (e.g., multiplied) with the match scores $604(1)$-$604(n)$ to produce weighted match scores $607(1)$-$607(n)$, respectively. The authenticator 640 is configured to generate the authentication output 608 based on a combination of the weighted match scores 607(1)-607(n). In some implementations, the authenticator 640 may generate an authentication output 608 indicating that the image 601 (or user) is authenticated if a combination (e.g., sum) of the weighted match scores 607(1)-607(n) exceeds (or is equal to) a matching threshold. Accordingly, the match scores associated with fingerprints having lower similarity scores (e.g., greater weights) will contribute more to the authentication output 608 than the match scores associated with fingerprints having higher similarity scores (e.g., lower weights). For example, fingerprints with high match scores and high similarity scores (e.g., residual fingerprints) may contribute little (if anything) to the combination of weighted match scores 607(1)-607(n).

As described with respect to FIGS. 1-6, adjunct templates (e.g., previous images of the sensing region) may be used to distinguish bonafide fingerprints from residual fingerprints. More specifically, the adjunct templates provide anti-spoofing measures that can be implemented using only the fingerprint sensors of an input device. Aspects of the present disclosure further recognize that some input devices may include one or more additional (e.g., "auxiliary") sensors that can be leveraged to further distinguish bonafide fingerprints from residual fingerprints. Examples of suitable auxiliary sensors include, but are not limited to, touch or proximity sensors and force sensors. In some embodiments, an input device may use the auxiliary sensor data to determine whether an input object (such as a user's finger) is in contact with the sensing region at the locations in which one or more fingerprints are detected. If no input object is detected at the location of a given fingerprint, the input device may classify or weight the fingerprint as a residual fingerprint.

With reference for example to the input device 200 of FIG. 2, the sensing region 210 is at least partially shared by the capacitive sensors 212 and fingerprint sensors 214. Thus, at least some of the sensor data from the capacitive sensors 212 may overlap or coincide with the sensor data from the fingerprint sensors 214. For example, when a user brings a finger in contact with the sensing region 210, the fingerprint sensors 214 may capture an image of the sensing region 210 (which includes the user's fingerprint) while the capacitive sensors 212 concurrently capture proximity information indicating a location of the user's finger in the sensing region 210. If the location of the user's finger, as detected by the capacitive sensors 212, coincides with the location of the fingerprint, as detected by the fingerprint sensors 214, the fingerprint verification sub-module 226 may classify or weight the detected fingerprint as a bonafide fingerprint. Otherwise, the fingerprint verification sub-module 226 may classify the or weight the detected fingerprint as a residual fingerprint.

Figure 7:
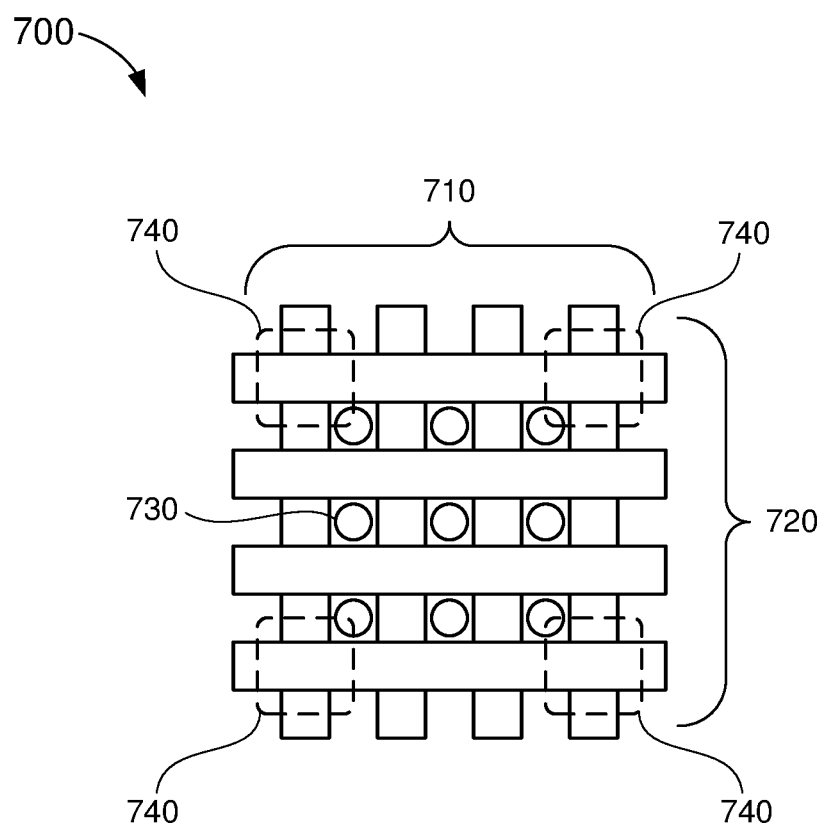
FIG. 7 shows another example sensor configuration that may be used for fingerprint authentication, in accordance with some embodiments.

FIG. 7 shows another example sensor configuration 700 that may be used for fingerprint authentication, in accordance with some embodiments. The sensor configuration 700 includes a capacitive sensor array formed by a number of sensor electrodes 710 arranged in a vertical pattern and a number of sensor electrodes 720 arranged in a horizontal pattern, a number of fingerprint sensing elements 730, and a number of force sensing elements 740. In some embodiments, the sensor configuration 700 may represent at least a portion of the sensing region 210 of FIG. 2 and/or the sensing region 120 of FIG. 1. The sensor electrodes 710 and 720 may correspond to the sensor electrodes 310 and 320, respectively, of FIG. 3 and/or one or more of the capacitive sensors 212 of FIG. 2. The fingerprint sensing elements 730 may correspond to the optical sensing elements 330 of FIG. 3 and/or one or more of the fingerprint sensors 214 of FIG. 2. Although depicted as optical sensing elements, the fingerprint sensing elements 730 may be configured to implement any feasible fingerprint sensing technique (such as capacitive, optical, ultrasonic, and the like) in actual implementations.

A "capacitive pixel" may represent an area of localized capacitive coupling between sensor electrodes 710 and sensor electrodes 720. When implementing transcapacitive sensing techniques, the capacitive coupling between sensor electrodes 710 and sensor electrodes 720 may change with a proximity and/or motion of input objects in the sensing region provided by the sensor configuration 700. A capacitive pixel may also represent an area of localized capacitance between an input object and sensor electrodes 710 or sensor electrodes 720. Thus, when implementing absolute capacitive sensing techniques, the absolute capacitance of the sensor electrodes 710 and/or 720 may change with a proximity and/or motion of an input object in the sensing region. A processing system (not shown for simplicity) may determine a location or proximity of an input object (such as a user's finger) with respect to the sensing region based on the capacitive coupling between the sensor electrodes 710 and 720.

In some embodiments, the processing system may distinguish between bonafide fingerprints and residual fingerprints detected by the fingerprint sensors 730 based, at least in part, on the location or proximity information detected by the sensor electrodes 710 and 720. For example, the processing system may determine the capacitance of one or more capacitive pixels coinciding with a location in the sensing region in which a fingerprint is detected. In some aspects, the processing system may classify the detected fingerprint as a bonafide fingerprint if the capacitance of the one or more capacitive pixels exceeds (or is equal to) a capacitance threshold, and may classify the detected fingerprint as a residual fingerprint if the capacitance of the one or more capacitive pixels is below the capacitance threshold. In some other aspects, the processing system may assign a weight to the detected fingerprint based on the capacitance levels of the one or more capacitive pixels.

In some other embodiments, the processing system may distinguish bonafide fingerprints and residual fingerprints detected by the fingerprint sensors 730 based, at least in part, on a shape and/or orientation of capacitive couplings between the sensor electrodes 710 and 720. For example, changes in capacitive coupling, responsive to objects interacting with the sensing region, may be localized to one or more subsets of capacitive pixels in the sensing region. Each localized subset of capacitive pixels affected by the presence of the object may be referred to herein as a "capacitive signature." Aspects of the present disclosure recognize that the shape, size, and/or orientation of the capacitive signature tracks the shape, size, and/or orientation of the object interacting with the sensing region. For example, when a user places his or her finger vertically in the sensing region (such as shown in FIG. 4), the capacitive signature associated therewith should correspond to a vertical oval of the roughly the same size as the user's finger. Similarly, when a user places his or her finger horizontally in the sensing region (such as shown in FIG. 1), the capacitive signature associated therewith should correspond to a horizontal oval of roughly the same size.

In some implementations, the processing system may classify the detected fingerprint as a bonafide fingerprint if the shape, size, and/or orientation of the fingerprint matches a shape, size, and/or orientation of a capacitive signature associated therewith. On the other hand, the processing system may classify the detected fingerprint as a residual fingerprint if the shape, size, and/or orientation of the fingerprint differs from the shape, size, and/or orientation of the capacitive signature by a threshold quantity. In some other implementations, the processing system may assign a weight to the detected fingerprint based on the degree of similarity in size, shape, and/or orientation of the fingerprint to the capacitive signature.

In some other embodiments, the processing system may leverage force information from the force sensing elements 740 to distinguish between bonafide fingerprints and residual fingerprints. More specifically, the processing system may determine, based on the force information, whether an input object is pressed against an input surface (such as may be required to capture a bonafide fingerprint). For example, the processing system may determine the amount of force exerted on one or more force sensing elements 740 coinciding with a location in the sensing region in which a fingerprint is detected. In some aspects, the processing system may classify the detected fingerprint as a bonafide fingerprint if the force on the one or more force sensing elements 740 exceeds (or is equal to) a force threshold, and may classify the detected fingerprint as a residual fingerprint if the force on the one or more force sensing elements 740 is below the force threshold. In some other aspects, the processing system may assign a weight to the detected fingerprint based on the amounts of force exerted on the one or more force sensing elements 740.

The force sensing elements 740 may be disposed in (or proximate to) the sensing region. In the example of FIG. 7, four force sensing elements 740 are shown in opposite corners of the sensing region, overlapping the sensor electrodes 710 and 720 and fingerprint sensing elements 730. In actual implementations, the sensor configuration 700 may include any number of force sensing elements 740, in various other arrangements, than what is depicted in FIG. 7. Each of the force sensing elements 740 may be configured to measure an amount of force exerted on a corresponding portion of an input surface coinciding with the sensing region. In some implementations, each force sensing element 740 may be formed from three layers of substrate. A first substrate layer may include a first electrode, a second substrate layer may include a second electrode, and a third substrate layer may be inserted between the first and second substrate layers to maintain a separation distance between the first electrode and the second electrode. For example, the third substrate layer may include an opening to expose at least a portion of the first electrode to the second electrode.

The first and second electrodes of each force sensing element 740 may form a variable capacitor. When a force is exerted on an input surface of the input device, the first substrate layer may deform and/or compress relative to the second substrate layer. This reduces the distance or gap between the first and second electrodes, which results in a change in capacitance across the electrodes. Specifically, the change in capacitance may be a function of the degree of movement of the first electrode relative to the second electrode. Thus, the change in capacitance may be directly correlated with the amount of force exerted on the input surface. The processing system may measure the change in capacitance of the first and second electrodes to determine force information about an input object in the sensing region.

In some other embodiments, the processing system may combine one or more adjunct templates with sensor information from the sensor electrodes 710 and 720 and/or force information from the force sensing elements 740 (collectively referred to as auxiliary sensor data) to distinguish between bonafide fingerprints and residual fingerprints. In some aspects, the processing system may use the auxiliary sensor data to further filter the bonafide fingerprints determined based on adjunct template similarity scores. For example, if a detected fingerprint has a low similarity score when compared with one or more adjunct templates, but very little force or change in capacitance is detected at the location of the fingerprint, the processing system may filter the detected fingerprint as a residual fingerprint. In some other aspects, the processing system may use the auxiliary sensor data to further refine the weighting assigned to fingerprints based on adjunct template similarity scores. For example, if a detected fingerprint has a low similarity score when compared with one or more adjunct templates, but very little force or change in capacitance is detected at the location of the fingerprint, the processing system may assign a very low weight to the detected fingerprint.

Figure 8A:
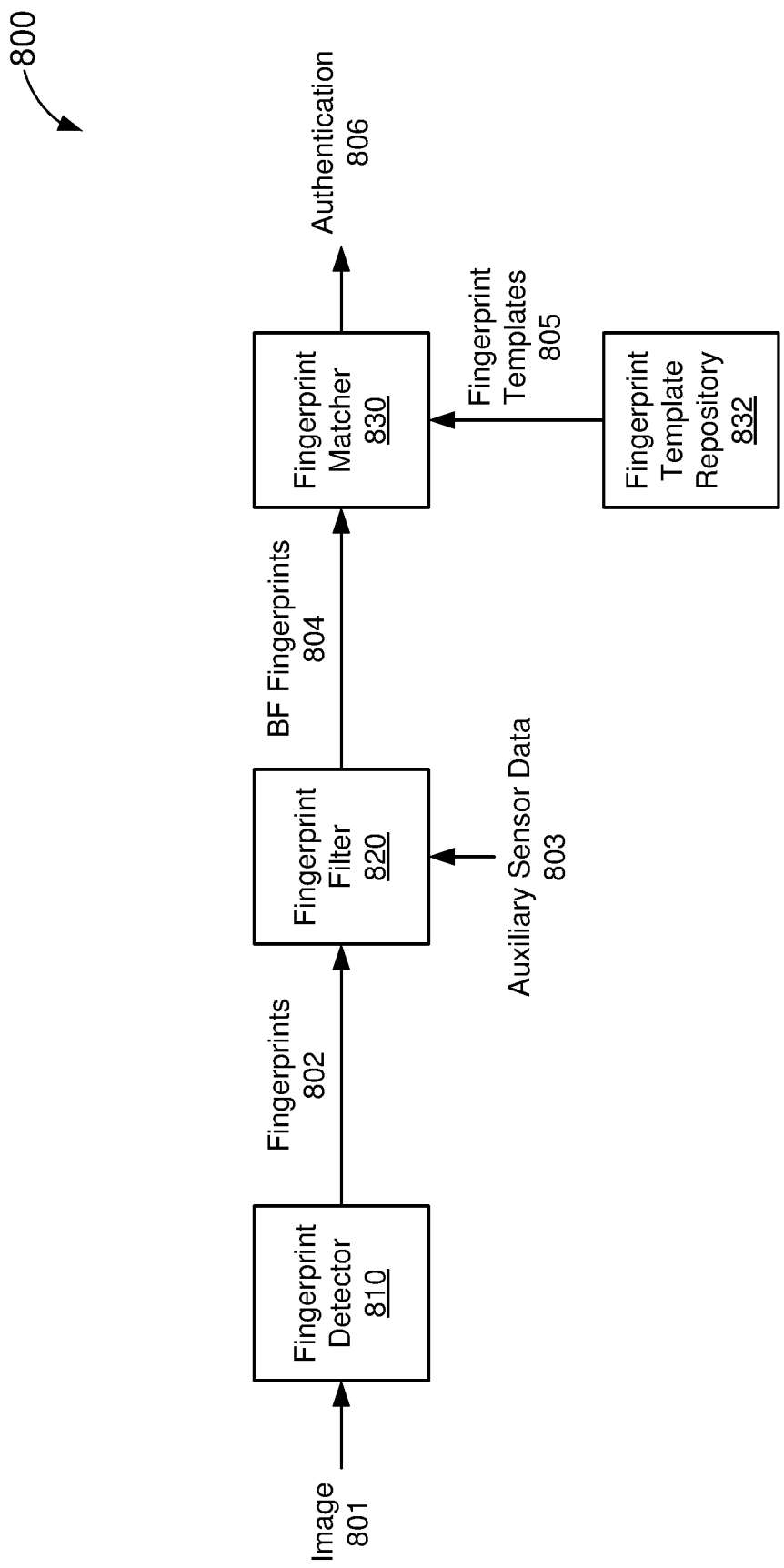
FIG. 8A shows another block diagram of a fingerprint authentication system, in accordance with some embodiments.

FIG. 8A shows another block diagram of a fingerprint authentication system 800, in accordance with some embodiments. The fingerprint authentication system 800 may be an example implementation of the input device 200 of FIG. 2 or, more specifically, the fingerprint verification sub-module 226. Accordingly, the fingerprint authentication system 800 may generate an authentication output 806 based on images 801 acquired via one or more biometric sensors (such as the fingerprint sensors 214 of FIG. 2). The authentication output 806 may indicate whether the image 801 contains one or more bonafide fingerprints belonging to an authorized user of the input device or electronic system.

The fingerprint authentication system 800 includes a fingerprint detector 810, a fingerprint filter 820, and a fingerprint matcher 830. The fingerprint detector 810 may be an example implementation of the fingerprint detector 510 of FIGS. 5A and 5B. Thus, the fingerprint detector 810 may be configured to detect one or more fingerprints 802 in the received image 801. In some implementations, the image 801 may be an optical image. In some other implementations, the image 801 may be a capacitive image.

The fingerprint filter 820 is configured to filter the fingerprints 802 detected by the fingerprint detector 810 based, at least in part, on auxiliary sensor data 803. The auxiliary sensor data 803 may be received from one or more auxiliary sensors such as, for example, the sensor electrodes 710 and 720 or the force sensing elements 740 of FIG. 7. In some embodiments, the fingerprint filter 820 may determine a likelihood of an input object (such as a bonafide finger) at the locations of each of the fingerprints 802 based on a force or change in capacitance at each of the locations. For example, the greater the force or change in capacitance at a given location the greater the likelihood of a finger at that location. If the force or change in capacitance at a given location exceeds a corresponding threshold, the fingerprint may be classified as a bonafide fingerprint 804. If the force or change in capacitance at a given location is below the corresponding threshold, the fingerprint may be filtered or eliminated as a residual fingerprint.

The fingerprint matcher 830 may be an example implementation of the fingerprint matcher 530 of FIG. 5A. Thus, the fingerprint matcher 830 may be configured to authenticate the image 801 based, at least in part, on the bonafide fingerprints 804 and one or more fingerprint templates 805 stored in a fingerprint template repository 832. The fingerprint templates 805 and fingerprint template repository 832 may be example implementations of the fingerprint template 232 and fingerprint template repository 230, respectively, of FIG. 2. In some embodiments, the fingerprint matcher 830 may determine a match score for each of the bonafide fingerprints 804 based on its level of similarity to one or more of the fingerprint templates 805. The fingerprint matcher 830 may further generate the authentication output 806 based on whether the match score for at least one of the bonafide fingerprints 804 exceeds (or is equal to) a matching threshold.

Figure 8B:
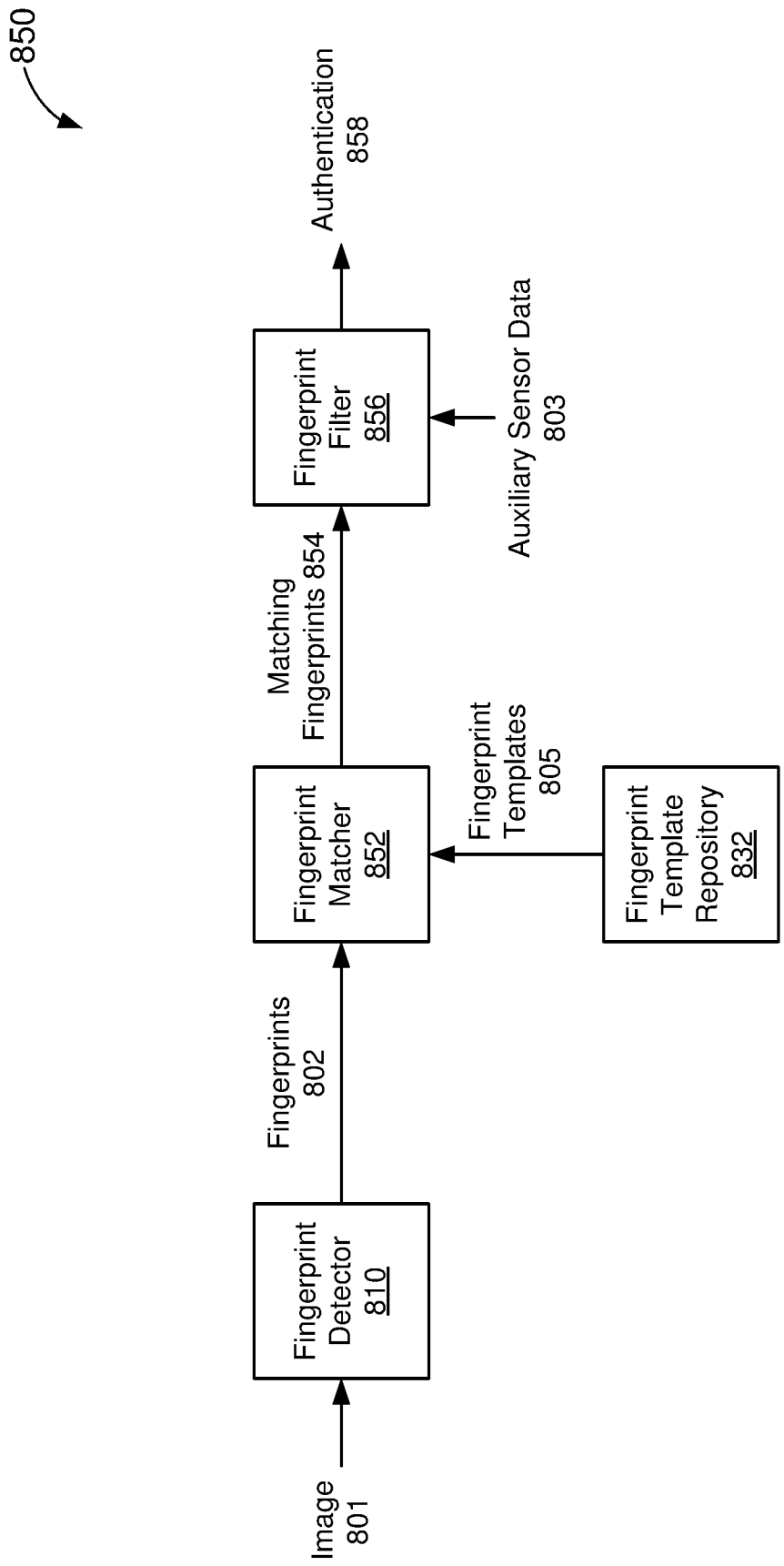
FIG. 8B shows another block diagram of a fingerprint authentication system, in accordance with some embodiments.

FIG. 8B shows another block diagram of a fingerprint authentication system 850, in accordance with some embodiments. The fingerprint authentication system 850 has substantially the same elements as the fingerprint authentication system 800 of FIG. 8A, however, the output of the fingerprint detector 810 is provided as input to a fingerprint matcher 852 and the output of the fingerprint matcher 852 is provided as input to a fingerprint filter 856. The fingerprint matcher 852 and fingerprint filter 856 may be respective examples of the fingerprint matcher 830 and fingerprint filter 820 of FIG. 8A. Thus, in the embodiment of FIG. 8B, the fingerprint authentication system 850 looks for matching fingerprints before filtering residual fingerprints from bonafide fingerprints.

The fingerprint matcher 852 may identify one or more matching fingerprints 854 among the detected fingerprints 802 based, at least in part, on the fingerprint templates 805 stored in the fingerprint template repository 832. In some embodiments, the fingerprint matcher 852 may determine whether one or more of the fingerprints 802 belongs to an authorized user by comparing the fingerprints 802 to the fingerprint templates 805. For example, the fingerprint matcher 852 may determine a match score for each of the fingerprints 802 based on its level of similarity to one or more of the fingerprint templates 805. In some implementations, the fingerprint matcher 852 may output a matching fingerprint 854 only if the match score for a corresponding fingerprint 802 exceeds (or is equal to) a matching threshold.

The fingerprint filter 856 may filter the matching fingerprints 854 based, at least in part, on the image 801 and the auxiliary sensor data 803. In some embodiments, the fingerprint filter 856 may determine which, if any, of the matching fingerprints 854 are bonafide fingerprints based on a force or change in capacitance at the respective locations of each of the fingerprints 854. For example, the greater the force or change in capacitance at a given location the greater the likelihood of a finger at that location. If the force or change in capacitance at a given location exceeds a corresponding threshold, the fingerprint 854 may be classified as a bonafide fingerprint. In some embodiments, the fingerprint filter 856 may generate an authentication output 858 indicating that the image 805 (or user) authenticated if at least one of the matching fingerprints 854 is a bonafide fingerprint. In some other implementations, the fingerprint filter 856 may indicate that the image 801 is authenticated only if a threshold number (n) of matching fingerprints 854 are bonafide fingerprints.

Figure 9:
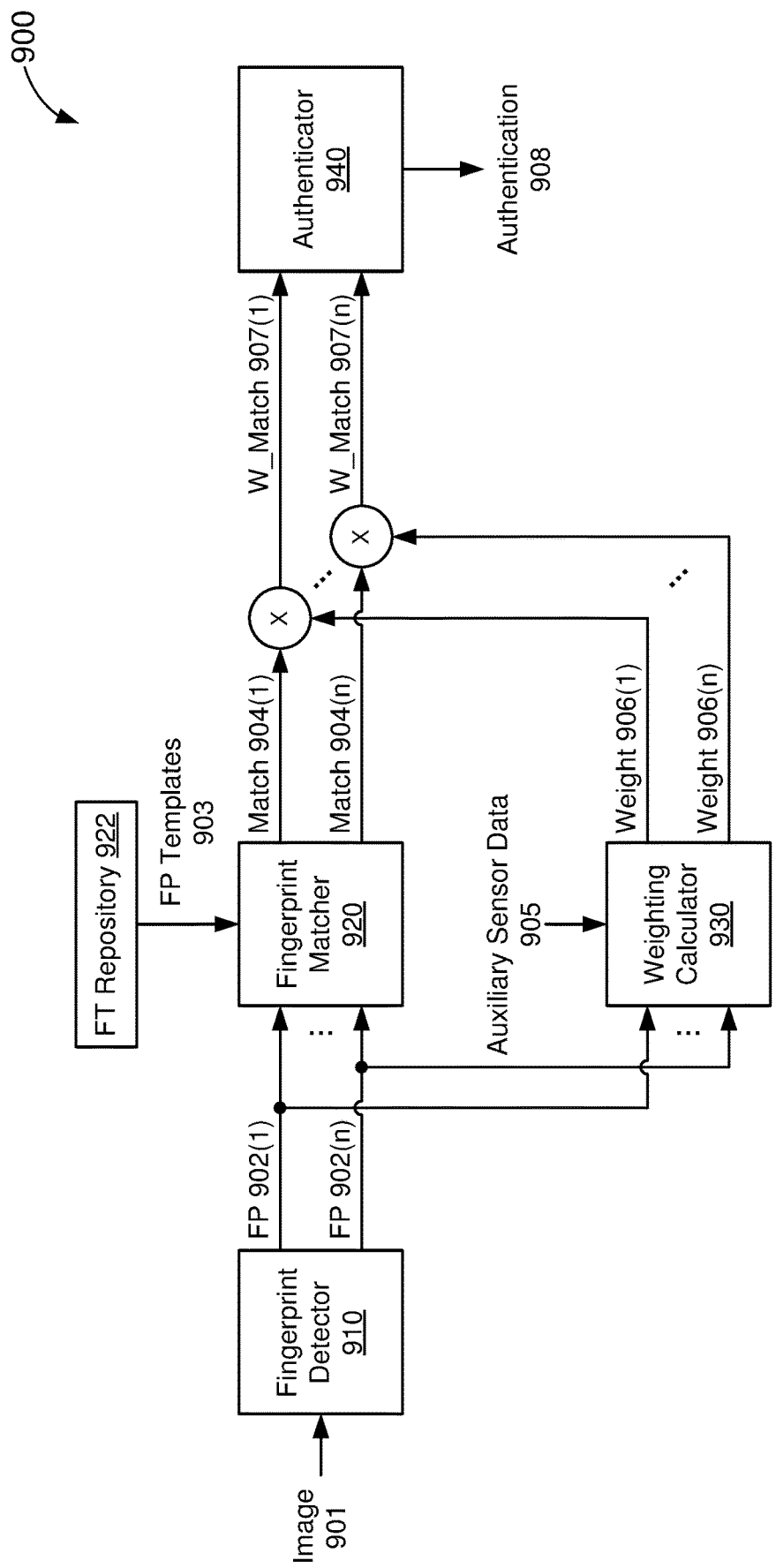
FIG. 9 shows another block diagram of a fingerprint authentication system, in accordance with some embodiments.

FIG. 9 shows another block diagram of a fingerprint authentication system 900, in accordance with some embodiments. The fingerprint authentication system 900 may be an example implementation of the input device 200 of FIG. 2 or, more specifically, the fingerprint verification sub-module 226. Accordingly, the fingerprint authentication system 900 may generate an authentication output 908 based on images 901 acquired via one or more biometric sensors (such as the fingerprint sensors 214 of FIG. 2). The authentication output 908 may indicate whether the image 901 contains one or more bonafide fingerprints belonging to an authorized user of the input device or electronic system.

The fingerprint authentication system 900 includes a fingerprint detector 910, a fingerprint matcher 920, a weighting calculator 930, and an authenticator 940. The fingerprint detector 910 may be an example implementation of the fingerprint detector 610 of FIG. 6. Thus, the fingerprint detector 910 may be configured to detect a number (n) of fingerprints (FP) 902(1)-902(n) in the received image 901. In some implementations, the image 901 may be an optical image. In some other implementations, the image 901 may be a capacitive image.

The fingerprint matcher 920 may be an example implementation of the fingerprint matcher 620 of FIG. 6. Thus, the fingerprint matcher 920 may be configured to determine a respective match score 904(1)-904(n) for each of the detected fingerprints 902(1)-902(n) based, at least in part, on one or more fingerprint (FP) templates 903 stored in a fingerprint template (FT) repository 922. The fingerprint templates 903 and fingerprint template repository 922 may be example implementations of the fingerprint template 232 and fingerprint template repository 230, respectively, of FIG. 2. In some embodiments, the fingerprint matcher 920 may determine the match scores 904(1)-904(n) based on the level of similarity of the fingerprints 902(1)-902(n), respectively, to one or more of the fingerprint templates 903.

The weighting calculator 930 is configured to determine a respective weight 906(1)-906(n) for each of the detected fingerprints 902(1)-902(n) based, at least in part, on auxiliary sensor data 905 received from one or more auxiliary sensors such as, for example, the sensor electrodes 710 and 720 or the force sensing elements 740 of FIG. 7. In some embodiments, the weighting calculator 930 may determine a likelihood of an input object (such as a bonafide finger) at the locations of each of the fingerprints 902(1)-902(n) based on a force or change in capacitance at each of the locations. For example, the greater the force or change in capacitance at a given location the greater the likelihood of a finger at that location. Fingerprints detected at locations with greater likelihoods of a finger may be given higher weights than fingerprints detected at locations with lower likelihoods of a finger. In other words, the weights 906(1)-906(n) may be proportional to the determined likelihood of a finger at the locations of each of the fingerprints 902(1)-902(n).

The weights 906(1)-906(n) are combined (e.g., multiplied) with the match scores 904(1)-904(n) to produce weighted match scores 907(1)-907(n), respectively. The authenticator 940 is configured to generate the authentication output 908 based on a combination of the weighted match scores 907(1)-907(n). The authenticator 940 may be an example implementation of the authenticator 640 of FIG. 6. Thus, the authenticator 940 may generate an authentication output 908 indicating that the image 901 (or user) is authenticated if the combination (e.g., sum) of weighted match scores 907(1)-907(n) exceeds (or is equal to) a matching threshold.

Figure 10:
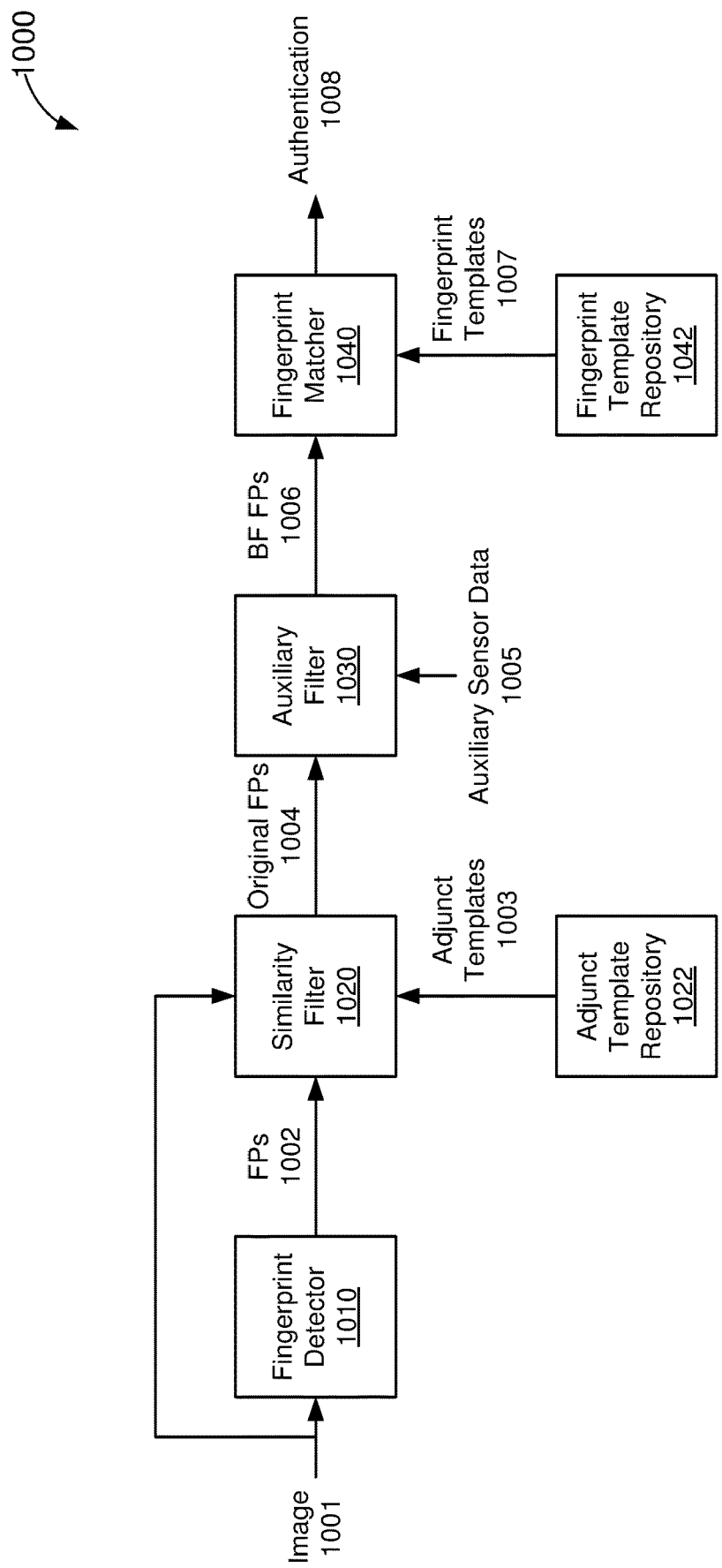
FIG. 10 shows another block diagram of a fingerprint authentication system, in accordance with some embodiments.

FIG. 10 shows another block diagram of a fingerprint authentication system 1000, in accordance with some embodiments. The fingerprint authentication system 1000 may be an example implementation of the input device 200 of FIG. 2 or, more specifically, the fingerprint verification sub-module 226. Accordingly, the fingerprint authentication system 1000 may generate an authentication output 1008 based on images 1001 acquired via one or more biometric sensors (such as the fingerprint sensors 214 of FIG. 2). The authentication output 1008 may indicate whether the image 1001 contains one or more bonafide fingerprints belonging to an authorized user of the input device or electronic system.

The fingerprint authentication system 1000 includes a fingerprint detector 1010, a similarity filter 1020, an auxiliary filter 1030, and a fingerprint matcher 1040. The fingerprint detector 1010 may be an example implementation of the fingerprint detector 510 and/or the fingerprint detector 610 of FIGS. 5 and 6, respectively. Thus, the fingerprint detector 1010 may be configured to detect one or more fingerprints 1002 in the received image 1001. In some implementations, the image 1001 may be an optical image. In some other implementations, the image 1001 may be a capacitive image.

The similarity filter 1020 may be an example implementation of the fingerprint filter 520 of FIG. 5A. Thus, the similarity filter 1020 may be configured to filter the fingerprints 1002 detected by the fingerprint detector 1010 based, at least in part, on the image 1001 and one or more adjunct templates 1003 stored in an adjunct template repository 1022. The adjunct templates 1003 and adjunct template repository 1022 may be example implementations of the adjunct template 234 and fingerprint template repository 230, respectively, of FIG. 2. In some embodiments, the fingerprint filter 1020 may determine a similarity score for each of the fingerprints 1002 based on its level of similarity to existing fingerprints in one or more of the adjunct templates 1003. Fingerprints that exceed (or are equal to) a similarity threshold may be filtered or eliminated from further consideration. As a result, only fingerprints with similarity scores below the similarity threshold are provided, as original fingerprints 1004, to the auxiliary filter 1030.

The auxiliary filter 1030 may be an example implementation of the fingerprint filter 820 of FIG. 8A. Thus, the auxiliary filter 1030 may be configured to further filter the original fingerprints 1004 based, at least in part, on auxiliary sensor data 1005. The auxiliary sensor data 1005 may be received from one or more auxiliary sensors such as, for example, the sensor electrodes 710 and 720 or the force sensing elements 740 of FIG. 7. In some embodiments, the auxiliary filter 1030 may determine a likelihood of an input object (such as a bonafide finger) at the locations of each of the original fingerprints 1004 based on a force or change in capacitance at each of the locations. If the force or change in capacitance at a given location exceeds a corresponding threshold, the original fingerprint may be classified as a bonafide fingerprint 1006. If the force or change in capacitance at a given location is below the corresponding threshold, the original fingerprint may be filtered or eliminated as a residual fingerprint.

The fingerprint matcher 1040 may be an example implementation of the fingerprint matcher 530 and/or the fingerprint matcher 830 of FIGS. 5 and 8, respectively. Thus, the fingerprint matcher 1040 may be configured to authenticate the image 1001 based, at least in part, on the bonafide fingerprints 1006 and one or more fingerprint templates 1007 stored in a fingerprint template repository 1042. The fingerprint templates 1007 and fingerprint template repository 1042 may be example implementations of the fingerprint template 232 and fingerprint template repository 230, respectively, of FIG. 2. In some embodiments, the fingerprint matcher 1040 may determine a match score for each of the bonafide fingerprints 1006 based on its level of similarity to one or more of the fingerprint templates 1007. The fingerprint matcher 1040 may further generate the authentication output 1008 based on whether the match score for at least one of the bonafide fingerprints 1006 exceeds (or is equal to) a matching threshold.

As shown in FIG. 10, the similarity filter 1020 and auxiliary filter 1030 are provided in front of the fingerprint matcher 1040. In other words, the fingerprint authentication system 1000 filters residual fingerprints from bonafide fingerprints before looking for matching fingerprints among the bonafide fingerprints. However, in some other implementations, one or both of the filters 1020 and/or 1030 may be provided after the fingerprint matcher 1040 such as described, for example, with reference to FIGS. 5B and 8B. In other words, the fingerprint authentication system 1000 may alternatively, or additionally, perform at least some of the filtering after one or more matching fingerprints have been identified.

Figure 11:
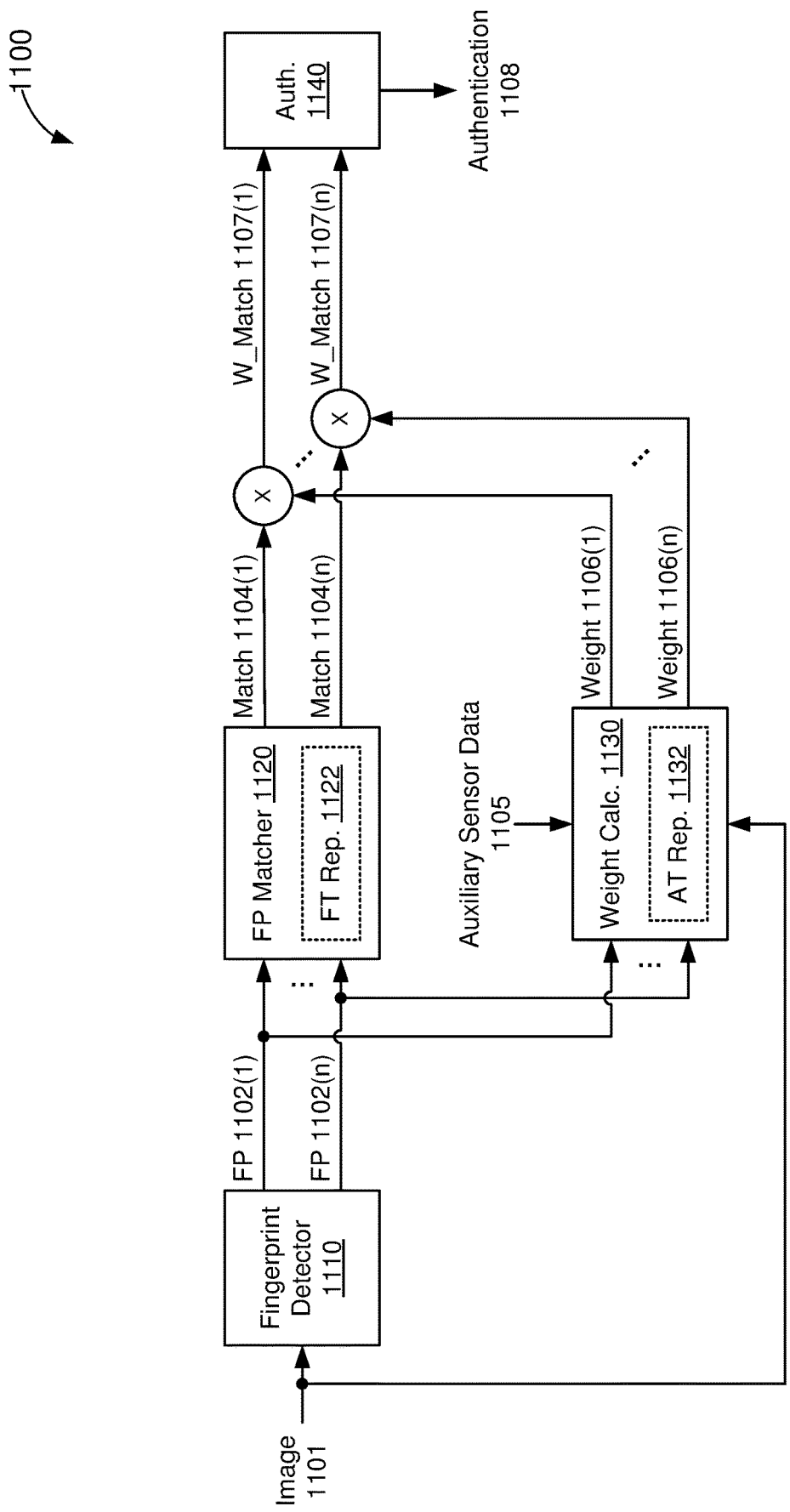
FIG. 11 shows another block diagram of a fingerprint authentication system, in accordance with some embodiments.

FIG. 11 shows another block diagram of a fingerprint authentication system 1100, in accordance with some embodiments. The fingerprint authentication system 1100 may be an example implementation of the input device 200 of FIG. 2 or, more specifically, the fingerprint verification sub-module 226. Accordingly, the fingerprint authentication system 1100 may generate an authentication output 1108 based on images 1101 acquired via one or more biometric sensors (such as the fingerprint sensors 214 of FIG. 2). The authentication output 1108 may indicate whether the image 1101 contains one or more bonafide fingerprints belonging to an authorized user of the input device or electronic system.

The fingerprint authentication system 1100 includes a fingerprint detector 1110, a fingerprint matcher 1120, a weighting calculator 1130, and an authenticator 1140. The fingerprint detector 1110 may be an example implementation of the fingerprint detector 610 and/or the fingerprint detector 910 of FIGS. 6 and 9, respectively. Thus, the fingerprint detector 1110 may be configured to detect a number (n) of fingerprints (FP) 1102(1)-1102(n) in the received image 1101. In some implementations, the image 1101 may be an optical image. In some other implementations, the image 1101 may be a capacitive image.

The fingerprint matcher 1120 may be an example implementation of the fingerprint matcher 620 and/or the fingerprint matcher 920 of FIGS. 6 and 9, respectively. Thus, the fingerprint matcher 1120 may be configured to determine a respective match score 1104(1)-1104(n) for each of the detected fingerprints 1102(1)-1102(n) based, at least in part, on one or more fingerprint templates stored in a fingerprint template (FT) repository 1122. The fingerprint template repository 1122 may be an example implementation of the fingerprint template repository 230 of FIG. 2. In some embodiments, the fingerprint matcher 1120 may determine the match scores 1104(1)-1104(n) based on the level of similarity of the fingerprints 1102(1)-1102(n), respectively, to one or more fingerprint templates stored in the fingerprint template repository 1122.

The weighting calculator 1130 is configured to determine a respective weight 1106(1)-1106(n) for each of the detected fingerprints 1102(1)-1102(n) based, at least in part, on auxiliary sensor data 1105 received from one or more auxiliary sensors and one or more adjunct templates stored in an adjunct template (AT) repository 1132. Example auxiliary sensors may include, but are not limited to, the sensor electrodes 710 and 720 and the force sensing elements 740 of FIG. 7. The adjunct template repository 1132 may be an example implementation of the adjunct template repository 230 of FIG. 2. In some embodiments, the weighting calculator 1130 may determine a likelihood of an input object (such as a bonafide finger) at the locations of each of the fingerprints 1102(1)-1102(n) based on a force or change in capacitance at each of the locations. In some other embodiments, the weighting calculator 1130 may determine a similarity score for each of the fingerprints 1102(1)-1102(n)

based on its level of similarity to existing fingerprints in one or more adjunct templates stored in the adjunct template repository 1132. A greater likelihood of a finger at a given location may contribute to in an increase in the weighting of the fingerprint at the location. On the other hand, a higher similarity scores may contribute to a decrease in the weighting of a corresponding fingerprint.

The weights 1106(1)-1106(n) are combined (e.g., multiplied) with the match scores 1104(1)-1104(n) to produce weighted match scores 1107(1)-1107(n), respectively. The authenticator 1140 is configured to generate the authentication output 1108 based on a combination of the weighted match scores 1107(1)-1107(n). The authenticator 1140 may be an example implementation of the authenticator 640 and/or the authenticator 940 of FIGS. 6 and 9, respectively. Thus, the authenticator 1140 may generate an authentication output 1108 indicating that the image 1101 (or user) is authenticated if the combination (e.g., sum) of the weighted match scores 1107(1)-1107(n) exceeds (or is equal to) a matching threshold.

Figure 12:
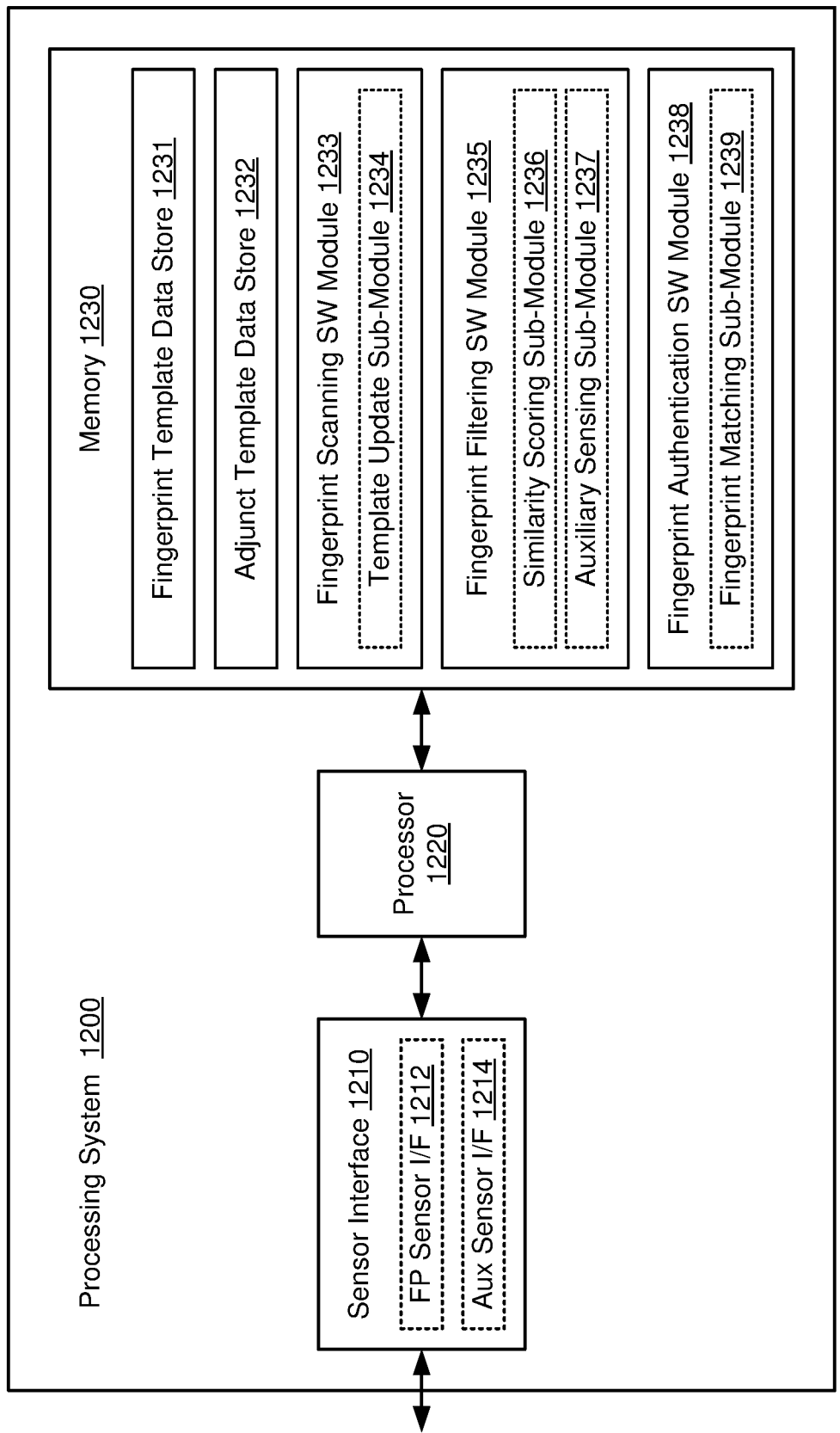
FIG. 12 shows a block diagram of a processing system configured for fingerprint authentication, in accordance with some embodiments.

FIG. 12 shows a block diagram of a processing system 1200 configured for fingerprint authentication, in accordance with some embodiments. The processing system 1200 may be an example implementation of the processing system 110 and/or the fingerprint scanning module 220 of FIGS. 1 and 2, respectively. Thus, the processing system 1200 may include a sensor interface 1210, a processor 1220, and a memory 1230. For purposes of discussion herein, the processor 1220 is shown in FIG. 12 as being coupled between the sensor interface 1210 and memory 1230. However, in actual implementations, the sensor interface 1210, processor 1220, and/or memory 1230 may be connected together using one or more buses (not shown for simplicity).

The sensor interface 1210 may include a fingerprint (FP) sensor interface (I/F) 1212 and auxiliary sensor interface 1214. The FP sensor interface 1212 may be used to communicate with one or more fingerprint sensors such as, for example, the fingerprint sensors 214 of FIG. 2. For example, the FP sensor interface 1212 may transmit activation signals to, and receive fingerprint sensor data from, one or more fingerprint sensors to acquire images (e.g., optical or capacitive images) of a sensing region. The auxiliary sensor interface 1214 may be used to communicate with one or more auxiliary sensors such as, for example, the capacitive sensors 212 of FIG. 2 and/or any of the sensor electrodes 710 and 720 or force sensing elements 740 of FIG. 7. for example, the auxiliary sensor interface 1214 may transmit activation signals to, and receive auxiliary sensor data from, one or more auxiliary sensors to acquire force or proximity information about input objects in the sensing region.

The memory 1230 includes a fingerprint template data store 1231 and an adjunct template data store 1232. The fingerprint template data store 1231 may be configured to store one or more fingerprint templates (such as the fingerprint templates 232 of FIG. 2) for one or more authorized users of the fingerprint sensing apparatus. The adjunct template data store 1232 may be configured to store one or more adjunct templates (such as the adjunct templates 234 of FIG. 2) for purposes of identifying residual fingerprints in the sensing region.

Memory 1230 may further include a non-transitory computer-readable medium (e.g., one or more nonvolatile memory elements, such as EPROM, EEPROM, Flash memory, a hard drive, and so on) that may store at least the following software (SW) modules:

- a fingerprint scanning SW module 1233 to scan a user's fingerprints, for example, by capturing images of the sensing region, the fingerprint scanning SW module 1233 including:
  - a template update sub-module 1234 to update the adjunct templates stored in the adjunct template data store 1232 to reflect a more current state of the sensing region;
- a fingerprint filtering SW module 1235 to filter one or more fingerprints received via the FP sensor interface 1212 to distinguish bonafide fingerprints from residual fingerprints, the fingerprint filtering SW module 1235 including:
  - a similarity scoring sub-module 1236 to determine a similarity score for each of the received fingerprints based on its level of similarity to existing fingerprints in one or more adjunct templates stored in the adjunct template data store 1232; and
  - an auxiliary sensing sub-module 1237 to determine a likelihood of a fingerprint at the locations of each of the received fingerprints based on auxiliary sensor data (such as a force or change in capacitance) detected at each of the locations; and
- a fingerprint authentication SW module 1238 to authenticate a user of the processing system 1200 based, at least in part, on the bonafide fingerprints, the fingerprint authentication SW module 1238 including:
  - a fingerprint matching sub-module 1239 to determine a match score for each of the bonafide fingerprints based on its level of similarity to one or more fingerprint templates stored in the fingerprint template data store 1231.

Each software module includes instructions that, when executed by processor 1220, cause the processing system 1200 to perform the corresponding functions. The non-transitory computer-readable medium of memory 1230 thus includes instructions for performing all or a portion of the operations described below with respect to FIGS. 14 and 15.

The processor 1220 may be any suitable one or more processors capable of executing scripts or instructions of one or more software programs stored in the processing system 1200 (e.g., within memory 1230). For example, the processor 1220 may execute the fingerprint scanning SW module 1233 to scan a user's fingerprints, for example, by capturing images of the sensing region. In executing the fingerprint scanning SW module 1233, the processor 1220 may further execute the template update sub-module 1234 to update the adjunct templates stored in the adjunct template data store 1232 to reflect a more current state of the sensing region.

The processor 1220 may also execute the fingerprint filtering SW module 1235 to filter one or more fingerprints received via the FP sensor interface 1212 to distinguish bonafide fingerprints from residual fingerprints. In executing the fingerprint filtering SW module 1235, the processor 1220 may further execute the similarity scoring sub-module 1236 and/or the auxiliary sensing sub-module 1237. For example, the processor 1220 may execute the similarity scoring sub-module 1236 to determine a similarity score for each of the received fingerprints based on its level of similarity to existing fingerprints in one or more adjunct templates stored in the adjunct template data store 1232. Additionally, or alternatively, the processor may execute the auxiliary sensing sub-module 1237 to determine a likelihood of a fingerprint at the locations of each of the received fingerprints based on auxiliary sensor data (such as a force or change in capacitance) detected at each of the locations.

The processor 1220 may further execute the fingerprint authentication SW module 1238 to authenticate a user of the processing system 1200 based, at least in part, on the bonafide fingerprints. In executing the fingerprint authentication SW module 1238, the processor 1220 may further execute the fingerprint matching sub-module 1239 to determine a match score for each of the bonafide fingerprints based on its level of similarity to one or more fingerprint templates stored in the fingerprint template data store 1231.

Figure 13:
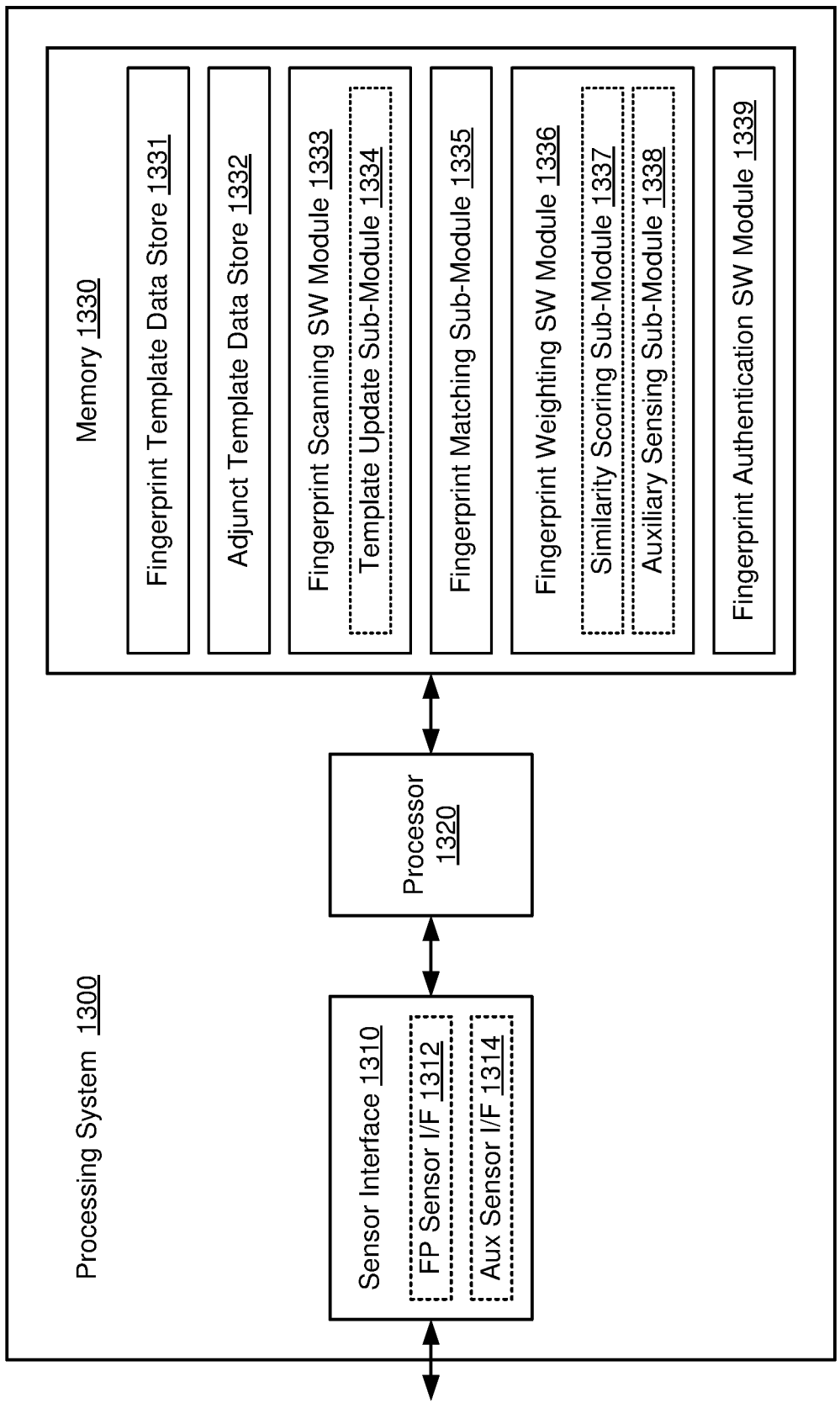
FIG. 13 shows another block diagram of a processing system configured for fingerprint authentication, in accordance with some embodiments.

FIG. 13 shows another block diagram of a processing system configured for fingerprint authentication, in accordance with some embodiments. The processing system 1300 may be an example implementation of the processing system 110 and/or the fingerprint scanning module 220 of FIGS. 1 and 2, respectively. Thus, the processing system 1300 may include a sensor interface 1310, a processor 1320, and a memory 1330. For purposes of discussion herein, the processor 1320 is shown in FIG. 13 as being coupled between the sensor interface 1310 and memory 1330. However, in actual implementations, the sensor interface 1310, processor 1320, and/or memory 1330 may be connected together using one or more buses (not shown for simplicity).

The sensor interface 1310 may include a fingerprint (FP) sensor interface (I/F) 1312 and auxiliary sensor interface 1314. The FP sensor interface 1312 may be used to communicate with one or more fingerprint sensors such as, for example, the fingerprint sensors 214 of FIG. 2. For example, the FP sensor interface 1312 may transmit activation signals to, and receive fingerprint sensor data from, one or more fingerprint sensors to acquire images (e.g., optical or capacitive images) of a sensing region. The auxiliary sensor interface 1314 may be used to communicate with one or more auxiliary sensors such as, for example, the capacitive sensors 212 of FIG. 2 and/or any of the sensor electrodes 710 and 720 or force sensing elements 740 of FIG. 7. for example, the auxiliary sensor interface 1314 may transmit activation signals to, and receive auxiliary sensor data from, one or more auxiliary sensors to acquire force or proximity information about input objects in the sensing region.

The memory 1330 includes a fingerprint template data store 1331 and an adjunct template data store 1332. The fingerprint template data store 1331 may be configured to store one or more fingerprint templates (such as the fingerprint templates 232 of FIG. 2) for one or more authorized users of the fingerprint sensing apparatus. The adjunct template data store 1332 may be configured to store one or more adjunct templates (such as the adjunct templates 234 of FIG. 2) for purposes of identifying residual fingerprints in the sensing region.

Memory 1330 may further include a non-transitory computer-readable medium (e.g., one or more nonvolatile memory elements, such as EPROM, EEPROM, Flash memory, a hard drive, and so on) that may store at least the following software (SW) modules:

a fingerprint scanning SW module 1333 to scan a user's fingerprints, for example, by capturing images of the sensing region, the fingerprint scanning SW module 1333 including:
    a template update sub-module 1334 to update the adjunct templates stored in the adjunct template data store 1332 to reflect a more current state of the sensing region;
a fingerprint matching SW module 1335 to determine a match score for each of the fingerprints received via the FP sensor interface 1312 based on its level of similarity to one or more fingerprint templates stored in the fingerprint template data store 1331;
a fingerprint weighting SW module 1336 to determine a weighting for each of the fingerprints received via the FP sensor interface 1312, the fingerprint weighting SW module 1336 including:
    a similarity scoring sub-module 1337 to determine a similarity score for each of the received fingerprints based on its level of similarity to existing fingerprints in one or more adjunct templates stored in the adjunct template data store 1332; and
    an auxiliary sensing sub-module 1338 to determine a likelihood of a fingerprint at the locations of each of the received fingerprints based on auxiliary sensor data (such as a force or change in capacitance) detected at each of the locations; and
a fingerprint authentication SW module 1339 to authenticate a user of the processing system 1200 based, at least in part, on the match score and the weighting for each of the fingerprints received via the FP sensor interface 1312.

Each software module includes instructions that, when executed by processor 1320, cause the processing system 1300 to perform the corresponding functions. The non-transitory computer-readable medium of memory 1330 thus includes instructions for performing all or a portion of the operations described below with respect to FIGS. 14 and 15.

The processor 1320 may be any suitable one or more processors capable of executing scripts or instructions of one or more software programs stored in the processing system 1300 (e.g., within memory 1330). For example, the processor 1320 may execute the fingerprint scanning SW module 1333 to scan a user's fingerprints, for example, by capturing images of the sensing region. In executing the fingerprint scanning SW module 1333, the processor 1320 may further execute the template update sub-module 1334 to update the adjunct templates stored in the adjunct template data store 1332 to reflect a more current state of the sensing region. The processor may also execute the fingerprint matching SW module 1335 to determine a match score for each of the fingerprints received via the FP sensor interface 1312 based on its level of similarity to one or more fingerprint templates stored in the fingerprint template data store 1331.

The processor 1320 may execute the fingerprint weighting SW module 1336 to determine a weighting for each of the fingerprints received via the FP sensor interface 1312. In executing the fingerprint weighting SW module 1336, the processor 1320 may further execute the similarity scoring sub-module 1336 and/or the auxiliary sensing sub-module 1337. For example, the processor 1320 may execute the similarity scoring sub-module 1336 to determine a similarity score for each of the received fingerprints based on its level of similarity to existing fingerprints in one or more adjunct templates stored in the adjunct template data store 1332. Additionally, or alternatively, the processor may execute the auxiliary sensing sub-module 1337 to determine a likelihood of a fingerprint at the locations of each of the received fingerprints based on auxiliary sensor data (such as a force or change in capacitance) detected at each of the locations. Still further, the processor 1320 may execute the fingerprint authentication SW module 1339 to authenticate a user of the processing system 1200 based, at least in part, on the match score and the weighting for each of the fingerprints received via the FP sensor interface 1312.

Figure 14:
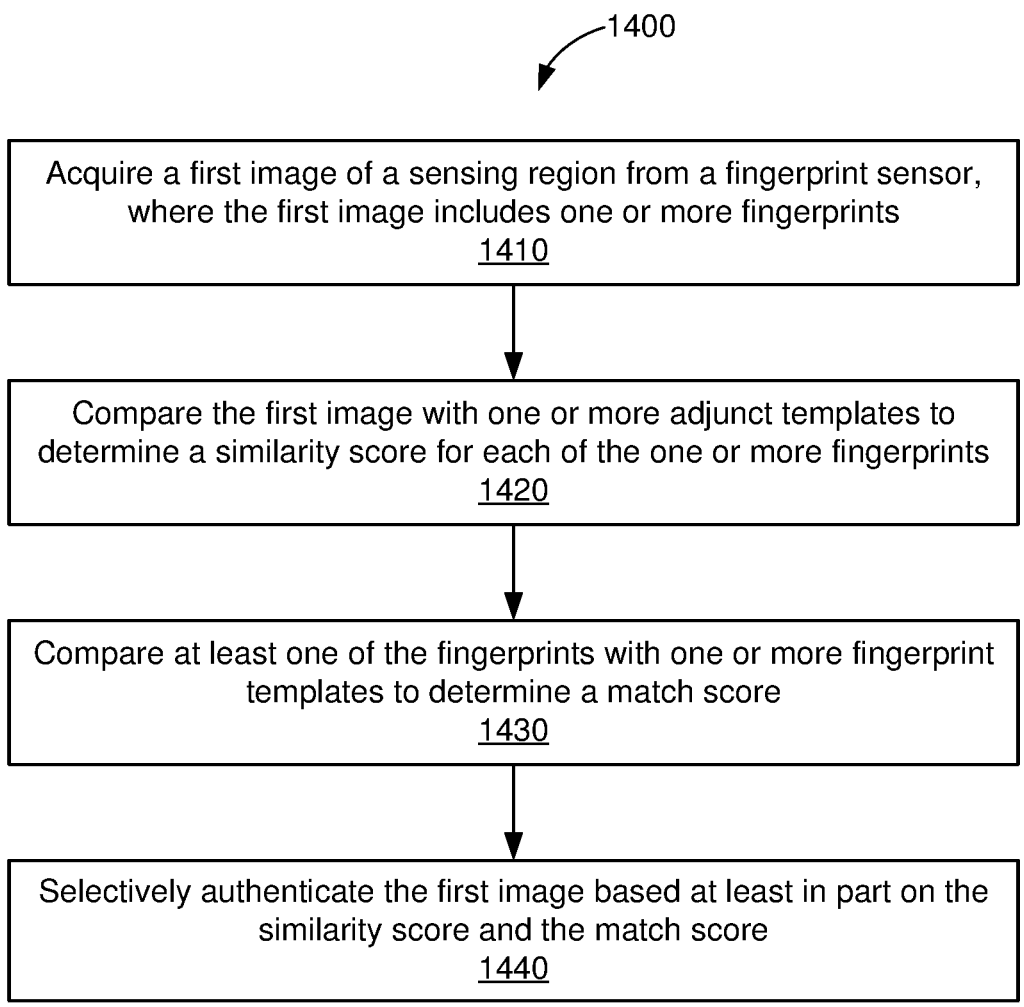
FIG. 14 shows an illustrative flowchart depicting an example fingerprint authentication operation, in accordance with some embodiments.

FIG. 14 shows an illustrative flowchart depicting an example fingerprint authentication operation 1400, in accordance with some embodiments. With reference for example to FIG. 2, the operation 1400 may be performed by the input device 200 to authenticate a user based, at least in part, on one or more of the user's fingerprints.

The input device acquires a first image of a sensing region from a fingerprint sensor, where the first image includes one or more fingerprints (1410). In some implementations, the image may be an optical image. In some other implementations, the image may be a capacitive image. With reference for example to FIG. 4, the image 400 may be an example image received by the input device. In some embodiments, the input device may detect or identify the one or more fingerprints in the first image using neural networks and/or other known fingerprint (or object) detection techniques.

The input device compares the first image with one or more adjunct templates to determine a similarity score for each of the one or more fingerprints (1420). For example, the input device may determine a similarity score for each of the fingerprints based on its level of similarity to existing fingerprints in one or more of the adjunct templates. As described above, the adjunct templates may indicate a presence and/or location of one or more residual fingerprints in the sensing region.

The input device further compares at least one of the fingerprints with one or more fingerprint templates to determine a match score (1430). For example, the input device may determine a match score for one or more of the fingerprints based on its level of similarity to one or more of the fingerprint templates. As described above, the fingerprint templates may indicate or otherwise describe a pattern of ridges and valleys (e.g., a biometric signature) on the surface of an authorized user's finger.

The input device selectively authenticates the first image based, at least in part, on the similarity score and the match score (1440). In some embodiments, the input device may distinguish bonafide fingerprints from residual fingerprints based, at least in part, on the similarity scores and filter the fingerprints such that only bonafide fingerprints are considered for purposes of authentication (such as described with respect to FIGS. 5 and 10). Accordingly, the first image may be authenticated if the match score for one or more of the bonafide fingerprints exceeds a matching threshold. In some other embodiments, the input device may weight the fingerprints based, at least in part, on the similarity scores such that bonafide fingerprints contribute more heavily to the user authentication determination than residual fingerprints (such as described with respect to FIGS. 6 and 11). Accordingly, the first image may be authenticated if the combined weighted match score exceeds a matching threshold.

Figure 15:
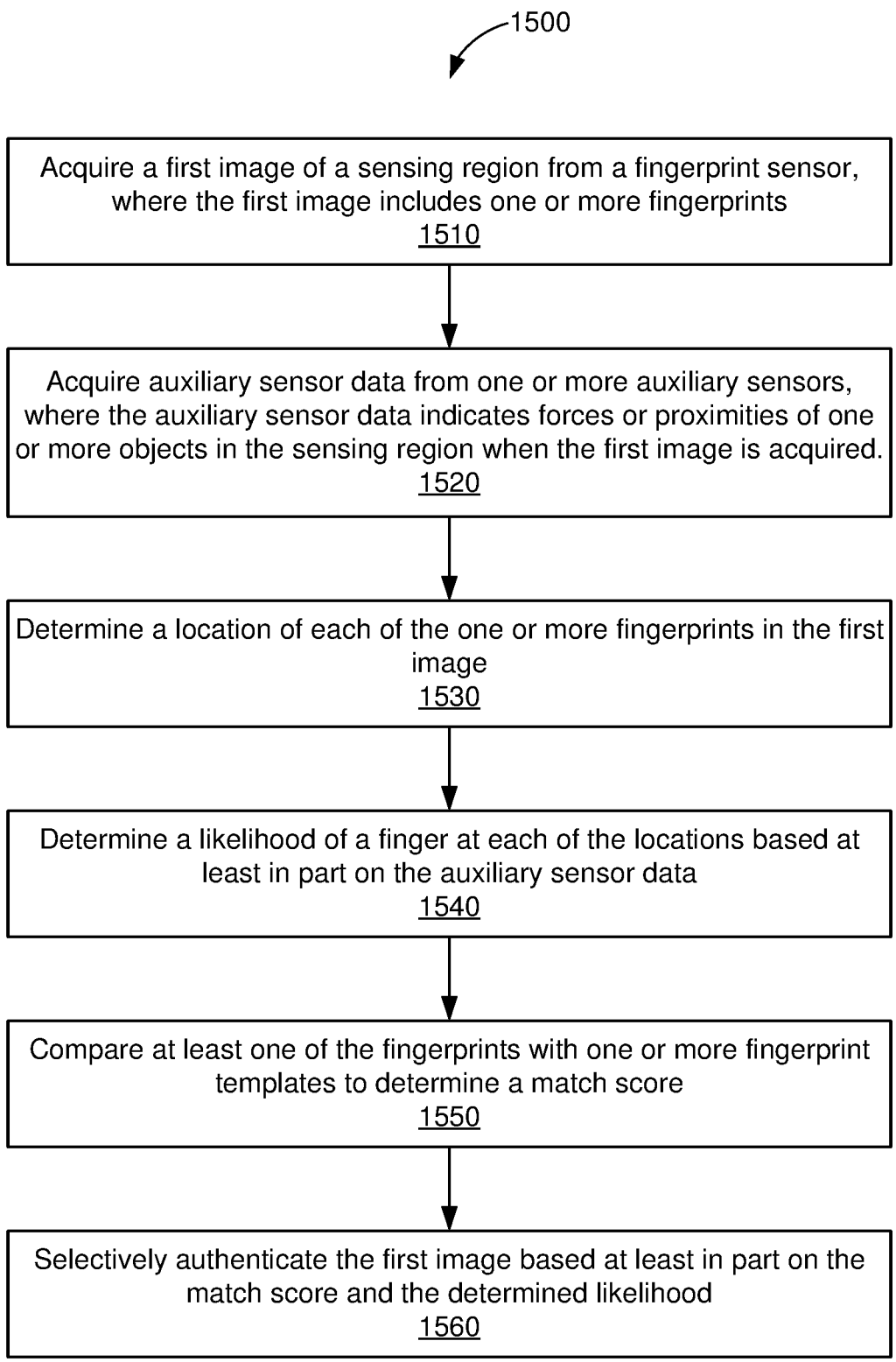
FIG. 15 shows an illustrative flowchart depicting another example fingerprint authentication operation, in accordance with some embodiments.

FIG. 15 shows an illustrative flowchart depicting another example fingerprint authentication operation 1500, in accordance with some embodiments. With reference for example to FIG. 2, the operation 1500 may be performed by the input device 200 to authenticate a user based, at least in part, on one or more of the user's fingerprints.

The input device acquires a first image of a sensing region from a fingerprint sensor, where the first image includes one or more fingerprints (1510). In some implementations, the image may be an optical image. In some other implementations, the image may be a capacitive image. With reference for example to FIG. 4, the image 400 may be an example image received by the input device. In some embodiments, the input device may detect or identify the one or more fingerprints in the first image using neural networks and/or other known fingerprint (or object) detection techniques.

The input device further acquires auxiliary sensor data from one or more auxiliary sensors, where the auxiliary sensor data indicates forces or proximities of one or more objects in the sensing region when the first image is acquired (1520). Example auxiliary sensors may include, but are not limited to, the sensor electrodes 710 and 720 or the force sensing elements 740 of FIG. 7. Thus, the auxiliary sensor data may indicate a force or change in capacitance at one or more locations in the sensing region.

The input device determines a location of each of the one or more fingerprints in the first image (1530) and determines a likelihood of a finger at each of the locations based at least in part on the auxiliary sensor data (1540). In some embodiments, the input device may determine the likelihood of an input object (such as a bonafide finger) at the locations of each of the fingerprints based on an amount of force or change in capacitance at each of the locations. For example, the greater the force or change in capacitance at a given location the greater the likelihood of a finger at that location. In some other embodiments, the input device may determine the likelihood of an input object at the locations of each of the fingerprints based on a shape or orientation of the capacitive sensing signature at each of the locations. For example, the greater the similarity in shape or orientation between a fingerprint and the capacitive sensing signature at a given location, the greater the likelihood of a finger at that location.

The input device further compares at least one of the fingerprints with one or more fingerprint templates to determine a match score (1550). For example, the input device may determine a match score for one or more of the fingerprints based on its level of similarity to one or more of the fingerprint templates. As described above, the fingerprint templates may indicate or otherwise describe a pattern of ridges and valleys (e.g., a biometric signature) on the surface of an authorized user's finger.

The input device selectively authenticates the first image based, at least in part, on the similarity score and the match score (1560). In some embodiments, the input device may distinguish bonafide fingerprints from residual fingerprints based, at least in part, on the likelihood of a finger at each of the fingerprint locations and filter the fingerprints such that only bonafide fingerprints are considered for purposes of authentication (such as described with respect to FIGS. 8 and 10). Accordingly, the first image may be authenticated if the match score for one or more of the bonafide fingerprints exceeds a matching threshold. In some other embodiments, the input device may weight the fingerprints based, at least in part, on the likelihood of a finger at each of the fingerprint locations such that bonafide fingerprints contribute more heavily to the user authentication determination than residual fingerprints (such as described with respect to FIGS. 9 and 11). Accordingly, the first image may be authenticated if the combined weighted match score exceeds a matching threshold.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. An input device comprising:
    a fingerprint sensor configured to capture images of a sensing region of the input device; and
    a processing system configured to:
        generate one or more fingerprint templates based on user inputs provided during a fingerprint enrollment operation;
        acquire a first image of the sensing region from the fingerprint sensor, the first image including one or more fingerprints;
        determine a similarity score for each of the one or more fingerprints by comparing the first image with one or more of the images of the sensing region captured prior to the first image;
        determine a match score for at least one of the fingerprints in the first image by:
            comparing the similarity score for each of the one or more fingerprints with a similarity threshold;
            selecting the fingerprints having similarity scores below the similarity threshold; and
            comparing the selected fingerprints with the one or more fingerprint templates; and
        selectively authenticate the first image based at least in part on the similarity score and the match score.

2. The input device of claim 1, wherein the first image is authenticated when the match score for at least one of the selected fingerprints is above or equal to a matching threshold.

3. The input device of claim 1, wherein the processing system is to authenticate the first image by:
    applying a weighting to the match score for each of the one or more fingerprints in the first image based at least in part on the respective similarity scores; and
    combining the weighted match scores for the one or more fingerprints to generate a combined weighted match score, wherein the first image is authenticated when the combined weighted match score is above or equal to a matching threshold.

4. The input device of claim 3, wherein the weighting is higher for fingerprints with lower similarity scores than for fingerprints with higher similarity scores.

5. The input device of claim 1, further comprising:
    one or more auxiliary sensors configured to detect a force or a proximity of objects in the sensing region, wherein the processing system is further configured to:
    determine a location of each of the one or more fingerprints in the first image; and
    determine a likelihood of a finger at each of the determined locations based on the detected force or proximity of one or more of the objects when the first image is acquired.

6. The input device of claim 5, wherein the processing system is to determine the match score by:
    comparing the likelihood of a finger at each of the determined locations with a likelihood threshold;
    selecting the fingerprints coinciding with locations where the likelihood of a finger is above or equal to the likelihood threshold; and
    comparing the selected fingerprints coinciding with the locations with the one or more fingerprint templates.

7. The input device of claim 6, wherein the first image is authenticated when the match score for at least one of the selected fingerprints coinciding with the locations is above or equal to a matching threshold.

8. The input device of claim 5, wherein the processing system is to authenticate the first image by:
    applying a weighting to the match score for each of the one or more fingerprints based at least in part on the likelihood of a finger at the determined locations; and
    combining the weighted match scores for the one or more fingerprints to generate a combined weighted match score, wherein the first image is authenticated when the combined weighted match score is above or equal to a matching threshold.

9. A method performed by an input device, comprising:
    generating one or more fingerprint templates based on user inputs provided during a fingerprint enrollment operation;
    acquiring a first image of a sensing region from a fingerprint sensor, wherein the first image includes one or more fingerprints;
    determining a similarity score for each of the one or more fingerprints by comparing the first image with one or more images of the sensing region captured prior to the first image;
    determining a match score for at least one of the fingerprints in the first image by:
        comparing the similarity score for each of the one or more fingerprints with a similarity threshold;
        selecting the fingerprints having similarity scores below the similarity threshold; and
        comparing the selected fingerprints with the one or more fingerprint templates; and
    selectively authenticating the first image based at least in part on the similarity score and the match score.

10. The method of claim 9, wherein the first image is authenticated when the match score for at least one of the selected fingerprints is above or equal to a matching threshold.

11. The method of claim 9, wherein the authenticating of the first image comprises:
    applying a weighting to the match score for each of the one or more fingerprints in the first image based at least in part on the respective similarity scores; and combining the weighted match scores for the one or more fingerprints to generate a combined weighted match score, wherein the first image is authenticated when the combined weighted match score is above or equal to a matching threshold.

12. The method of claim 11, wherein the weighting is higher for fingerprints with lower similarity scores than for fingerprints with higher similarity scores.

13. The method of claim 9, further comprising:
detecting a force or a proximity of one or more objects in the sensing region when the first image is acquired;
determining a location of each of the one or more fingerprints in the first image; and
determining a likelihood of a finger at each of the determined locations based on the detected force or proximity of the one or more objects.

14. The method of claim 13, wherein the determining of the match score comprises:
comparing the likelihood of a finger at each of the determined locations with a likelihood threshold;
selecting the fingerprints coinciding with locations where the likelihood of a finger is above or equal to the likelihood threshold; and
comparing the selected fingerprints coinciding with the locations with the one or more fingerprint templates.

15. The method of claim 13, wherein the authenticating of the first image comprises:
applying a weighting to the match score for each of the one or more fingerprints based at least in part on the likelihood of a finger at the determined locations; and
combining the weighted match scores for the one or more fingerprints to generate a combined weighted match score, wherein the first image is authenticated when the combined weighted match score is above or equal to a matching threshold.

16. An input device, comprising:
a fingerprint sensor configured to capture images of a sensing region;
one or more auxiliary sensors configured to detect forces or proximities of objects in the sensing region; and
a processing system configured to:
generate one or more fingerprint templates based on user inputs provided during a fingerprint enrollment operation;
acquire a first image of the sensing region from the fingerprint sensor, the first image including one or more fingerprints;
acquire auxiliary sensor data from the one or more auxiliary sensors, the auxiliary sensor data indicating the forces or the proximities of one or more of the objects in the sensing region when the first image is acquired;
determine a location of each of the one or more fingerprints in the first image;
determine a likelihood of a finger at each of the locations based on the auxiliary sensor data;
determine a match score for at least one of the fingerprints in the first image by comparing the at least one fingerprint with the one or more fingerprint templates; and
selectively authenticate the first image based at least in part on the match score and the determined likelihood.

17. The input device of claim 16, wherein the processing system is to determine the match score by:
comparing the likelihood of a finger at each of the determined locations with a likelihood threshold; and
selecting only the fingerprints coinciding with locations where the likelihood of a finger is above or equal to the likelihood threshold to be compared with the one or more fingerprint templates.

18. The input device of claim 16, wherein the processing system is to authenticate the first image by:
applying a weighting to the match score for each of the one or more fingerprints based at least in part on the likelihood of a finger at the determined locations; and
combining the weighted match scores for the one or more fingerprints to generate a combined weighted match score, wherein the first image is authenticated when the combined weighted match score is above or equal to a matching threshold.

* * * * *